US 12,432,087 B2

(12) United States Patent
Elend et al.

(10) Patent No.: US 12,432,087 B2
(45) Date of Patent: Sep. 30, 2025

(54) DELAY MODULE FOR A CONTROLLER AREA NETWORK (CAN), A CAN DEVICE, AND A METHOD FOR THE DELAY MODULE

(71) Applicant: NXP B.V., Eindhoven (NL)

(72) Inventors: Bernd Uwe Gerhard Elend, Hamburg (DE); Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/638,086

(22) Filed: Apr. 17, 2024

(65) Prior Publication Data
US 2024/0356773 A1    Oct. 24, 2024

(30) Foreign Application Priority Data
Apr. 18, 2023  (EP) .................................. 23168573

(51) Int. Cl.
*H04L 12/40* (2006.01)
*G06F 11/07* (2006.01)

(52) U.S. Cl.
CPC .... *H04L 12/40013* (2013.01); *G06F 11/0745* (2013.01); *H04L 2012/40215* (2013.01)

(58) Field of Classification Search
CPC ..... H04L 12/40013; H04L 2012/40215; G06F 11/0745
See application file for complete search history.

(56) References Cited

U.S. PATENT DOCUMENTS

| 7,017,072 | B1 | 3/2006 | Barrenscheen et al. |
| 9,054,851 | B2 | 6/2015 | Bowling et al. |
| 11,196,585 | B1 | 12/2021 | Auerbach et al. |
| 11,422,962 | B2 | 8/2022 | Green et al. |
| 11,502,876 | B2 | 11/2022 | Walker et al. |
| 11,722,327 | B2 | 8/2023 | Muth |

(Continued)

FOREIGN PATENT DOCUMENTS

| CN | 113949116 A | * | 1/2022 | ............ G06F 13/36 |
| EP | 2940935 A1 |   | 11/2015 | |

(Continued)

OTHER PUBLICATIONS

Translation of CN-113949116-A (Year: 2022).*

(Continued)

*Primary Examiner* — Henry Tsai
*Assistant Examiner* — John B Roche

(57) ABSTRACT

The present disclosure relates to a delay module for a CAN device. The delay module is configured to delay only a single signal change of an RXD signal, wherein the single signal change forms the end of an idle state. Use of the delay module allows a second RXD signal to be generated. The present disclosure further relates to a CAN device comprising two CAN controllers. Each of the two CAN controllers may be provided with one of the two RXD signals. The CAN device may further be configured to detect possible errors based on the decoded bits of the RXD signals. As a result, the CAN device can communicate error-free with both distantly located further CAN devices and closely located further CAN devices, while ensuring a high data rate. The present disclosure also relates to a method for the delay module.

20 Claims, 8 Drawing Sheets

(56) References Cited

U.S. PATENT DOCUMENTS

| | | |
|---|---|---|
| 11,831,466 B2 | 11/2023 | Mutter et al. |
| 12,284,053 B2 | 4/2025 | Stegemann et al. |
| 12,314,203 B2 | 5/2025 | Jochen et al. |
| 2014/0215109 A1 | 7/2014 | Hopfner |
| 2015/0095711 A1 | 4/2015 | Elend |
| 2015/0312052 A1 | 10/2015 | Horst et al. |
| 2016/0196230 A1 | 7/2016 | Pihet |
| 2018/0137071 A1 | 5/2018 | Sturm et al. |
| 2020/0327085 A1 | 10/2020 | Kang |
| 2020/0364174 A1* | 11/2020 | Chandra ............. G06F 13/4273 |
| 2021/0184890 A1* | 6/2021 | Kim ................ H04L 12/40039 |
| 2021/0360526 A1* | 11/2021 | Nagamani ......... H04W 52/0235 |
| 2022/0393715 A1 | 12/2022 | Walker et al. |
| 2024/0356775 A1 | 10/2024 | Elend et al. |

FOREIGN PATENT DOCUMENTS

| | | |
|---|---|---|
| EP | 3217602 A1 | 9/2017 |
| EP | 3393061 A1 | 10/2018 |
| EP | 3926904 A1 | 12/2021 |

OTHER PUBLICATIONS

ISO 11898-1; 65 pages (Dec. 2015).
Notice of Allowance; U.S. Appl. No. 18/637,786; 13 pages (Jun. 10, 2025).

\* cited by examiner

DELAY MODULE FOR A CONTROLLER AREA NETWORK (CAN), A CAN DEVICE, AND A METHOD FOR THE DELAY MODULE

CROSS-REFERENCE TO RELATED APPLICATIONS

This application claims priority under 35 U.S.C. § 119 to European patent application number 23168573.6, filed Apr. 18, 2023, the contents of which are incorporated by reference herein.

TECHNICAL FIELD

The present disclosure relates to a delay module for a Controller Area Network, a CAN device and a method for the delay module.

BACKGROUND

Controller area network (CAN) buses can be used for communications within vehicles, in particular within automobiles. It will be appreciated that CAN buses also have application outside of the field of automobiles. A CAN bus system may include multiple CAN devices, so called as nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. Several nodes may be connected to a CAN network, such that the nodes can communicate among each other over the CAN network using a CAN protocol. The CAN protocol is used to enable communications between the various nodes. The data link layer of the CAN protocol is standardized as International Standards Organization (ISO) 11898-1:2003. CAN Flexible Data-Rate or "CAN FD," which is an extension of the standardized CAN data link layer protocol and is integrated into the ISO11898-1:2015 standard, CAN FD may provide higher data rates. The standardized CAN data link layer protocol is being further extended to provide even higher data rates. A further extension, referred to as CAN XL, with a new (optional) level scheme on the physical layer allowing even higher data rates is in the definition phase discussed under CiA610 (CAN in Automation) and is moving towards standardization in the form of ISO11898-1:202x.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

According to a first aspect of the present disclosure, a delay module for a Controller Area Network, CAN, device is provided, wherein the CAN device comprising: a first module interface for receiving a first receive data, RXD, signal from a CAN Transceiver unit, which is configured to be connected to a CAN bus network, a second module interface for transmitting a second RXD signal, and a delay unit coupled between the first module interface and the second module interface, wherein the delay unit is configured to perform steps a) to c):
 a) detect a first idle state of the CAN bus network based on the first RXD signal;
 b) detect, at a first reference time at the end of the first idle state, a first signal change from a recessive signal level of the first RXD signal to a dominant signal level of the first RXD signal; and
 c) generate the second RXD signal based on the first RXD signal by delaying, through the delay unit, only the first signal change of the first RXD signal for a predetermined first delay time, so that the second RXD signal has a second signal change at a second reference time instead of the first signal change at the first reference time.

According to a second aspect of the present disclosure, a CAN device is provided, the CAN device comprising: a delay module according to claim 1, a CAN controller unit, and a CAN transceiver unit; the CAN controller unit comprising a first CAN controller and a second CAN controller; wherein the CAN transceiver unit comprising at least one CAN transceiver; wherein a first RXD interface of the first CAN controller is coupled to the CAN transceiver unit for receiving the first RXD signal at the first CAN controller; wherein a second RXD interface of the second CAN controller is coupled via the Delay module to the CAN transceiver unit for receiving the second RXD signal at the second CAN controller; and wherein the first CAN controller is configured to perform steps d) to g):
 d) Sample a plurality of bit values of the first RXD signal;
 e) Detect the first idle state of the CAN bus network based on the bit values of step d);
 f) Detect a first error, if each of the next two bit values of the first RXD signal following the first idle state represents a dominant signal level;
 g) Generate a first RXD frame based on the bit values of the first RXD signal following the first idle state, if the first error is not detected;
wherein the second CAN controller is configured to perform steps h) to k):
 h) Sample a plurality of bit values of the second RXD signal;
 i) Detect a second idle state of the CAN bus network based on the bit values of step h);
 j) Detect a second error, if each of the next two bit values of the second RXD signal following the second idle state represents a dominant signal level;
 k) Generate a second RXD frame based on the bit values of the second RXD signal following the second idle state, if the second error is not detected;
wherein the CAN controller unit is configured to perform step n) and at least one of the steps l) and m):
 l) select the first RXD frame as a valid RXD frame, if the first error is not detected,
 m) select the second RXD frame as a valid RXD frame, if both the first and second error are not detected,
 n) select the second RXD frame as the valid RXD frame, if both the first error is detected and the second error is not detected.

In one or more embodiments, the next two bit values of the first RXD signal following the first idle state are referred to as the first bit value of the first RXD signal and the subsequent second bit value of the first RXD signal; and wherein the first CAN controller is configured to perform a first check whether the first bit value of the first RXD signal represents a dominant signal level and whether the second bit value of the first RXD signal represents a recessive signal level, wherein the first CAN controller is configured to prevent the detection of the first error, if a result of the first check indicates that the first bit value of the first RXD signal represents a dominant signal level and that the second bit value of the first RXD signal represents a recessive signal level.

In one or more embodiments, the next two bit values of the second RXD signal following the second idle state are referred to as the first bit value of the second RXD signal and the subsequent second bit value of the second RXD signal; and wherein the second CAN controller is configured to perform a second check whether the first bit value of the second RXD signal represents a dominant signal level and whether the second bit value of the second RXD signal represents a recessive signal level, wherein the second CAN controller is configured to prevent the detection of the second error, if a result of the second check indicates that the first bit value of the second RXD signal represents a dominant signal level and that the second bit value of the second RXD signal represents a recessive signal level.

In one or more embodiments, a first transmit data, TXD, interface of the first CAN controller is coupled to the CAN transceiver unit; wherein the first CAN controller is configured to change between a send mode and a receive mode, wherein the first CAN controller, if in the send mode, is configured to perform step o):
  o) Transmit a TXD signal representing a TXD frame via the first TXD interface to the CAN transceiver unit.

In one or more embodiments, a start of frame, SOF, bit of the TXD frame is a dominant bit and the next bit of the TXD frame following the SOF bit is a recessive bit.

In one or more embodiments, the first CAN controller, if in the send mode, is configured to cancel step o), if the first error is detected.

In one or more embodiments, the first CAN controller, if in the send mode, is configured to perform bitwise arbitration based on the bits of the TXD frame and the sampled bit values of the first RXD signal, in particular for the first RXD frame, and to cancel step o), if the arbitration indicates that at least one bit of the TXD frame differs from a corresponding sampled bit value of the first RXD signal, in particular for the first RXD frame.

In one or more embodiments, the first CAN controller, if in the send mode, is configured to sample the first bit value of the first RXD signal, such that a first time interval is provided between a start time of step o) and a first sampling time of the first bit value of the first RXD signal, wherein the first time interval is between 30% and 90% of a predefined reference time interval; and wherein the first CAN controller, if in the send mode, is configured to sample the second bit value of the first RXD signal, such that the reference time interval is provided between the first sampling time and a sampling time of the second bit value of the first RXD signal.

In one or more embodiments, the first CAN controller, if in the receive mode, is configured to sample the first bit value of the first RXD signal, such that a second time interval is provided between an end of the first idle state and the third sampling time of the first bit value of the first RXD signal, wherein the second time interval is between 30% and 90% of a predefined reference time interval; and wherein the first CAN controller, if in the receive mode, is configured to sample the second bit value of the first RXD signal, such that the reference time interval is provided between the third sampling time and the sampling time of the second bit value of the first RXD signal.

In one or more embodiments, the second CAN controller is configured to sample the first bit value of the second RXD signal, such that a third time interval is provided between an end of the second idle state and a fifth sampling time of the first bit value of the second RXD signal, wherein the third time interval is between 30% and 90% of a predefined reference time interval; and wherein the second CAN controller is configured to sample the second bit value of the second RXD signal, such that the reference time interval is provided between the fifth sampling time and a sampling time of the second bit value of the second RXD signal.

In one or more embodiments, the reference time interval is less than two microseconds, preferably between 200 nanoseconds and 1500 nanoseconds.

In one or more embodiments, the first delay time is between 30% and 190% of the reference time interval, preferably between 60% and 90% of the reference time interval.

In one or more embodiments, CAN controller unit is configured to extract a payload of the valid RXD frame, and wherein the controller unit is configured to store the payload and/or to transmit the payload via a further interface of the controller unit.

According to a third aspect of the present disclosure, a method for a delay module for a Controller Area Network, CAN, device is provided, wherein the delay module comprising a first module interface, a second module interface, and a delay unit coupled between the first module interface and the second module interface, and wherein the method comprising the steps:
  a.0) receiving a first receive data, RXD, signal at the first module interface;
  a) detecting a first idle state of a CAN bus network based on the first RXD signal;
  b) detecting, at a first reference time at the end of the first idle state, a first signal change from a recessive signal level to a dominant signal level represented by the first RXD signal;
  c) generating a second RXD signal based on the first RXD signal by delaying, through the delay unit, only the first signal change of the first RXD signal for a predetermined first delay time, so that the second RXD signal has a second signal change at a second reference time instead of the first signal change at the first reference time; and
  c.1) transmitting the second RXD signal via the second module interface.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
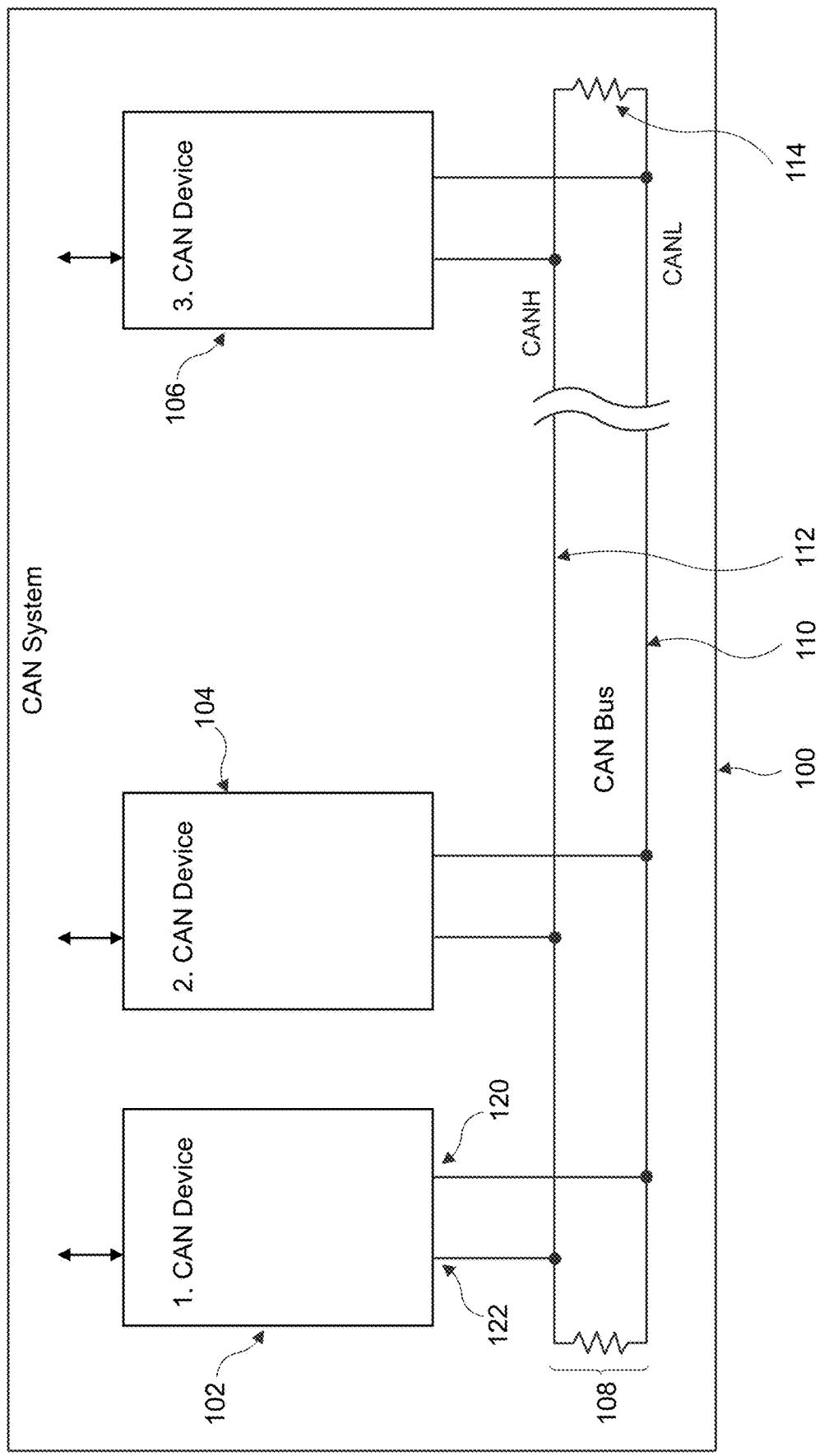
FIG. 1 shows a block diagram of an embodiment of a CAN System.

FIG. 1 shows an example of a CAN system 100. The CAN system 100 includes a plurality of CAN devices 102, 104, 106 and a CAN BUS network 108. The CAN BUS network 108 includes a first CAN line 110, also referred to as CANH, and a second CAN line 112, also referred to as CANL. The two CAN lines 110, 112 may be coupled at opposite ends via terminating resistors 114. The CAN BUS network 108 may also be referred to as CAN bus 108.

Each CAN device 102, 104, 106 is coupled to the CAN BUS network 108. For coupling, each CAN device 102, 104, 106 includes a first interface 120, also referred to as a first device interface 120, and a second interface 122, also referred to as a second device interface 122. Each CAN device 102, 104, 106 may be connected to the first CAN line 110 and the second CAN line 112 via the associated device interfaces 120, 122.

Figure 2:
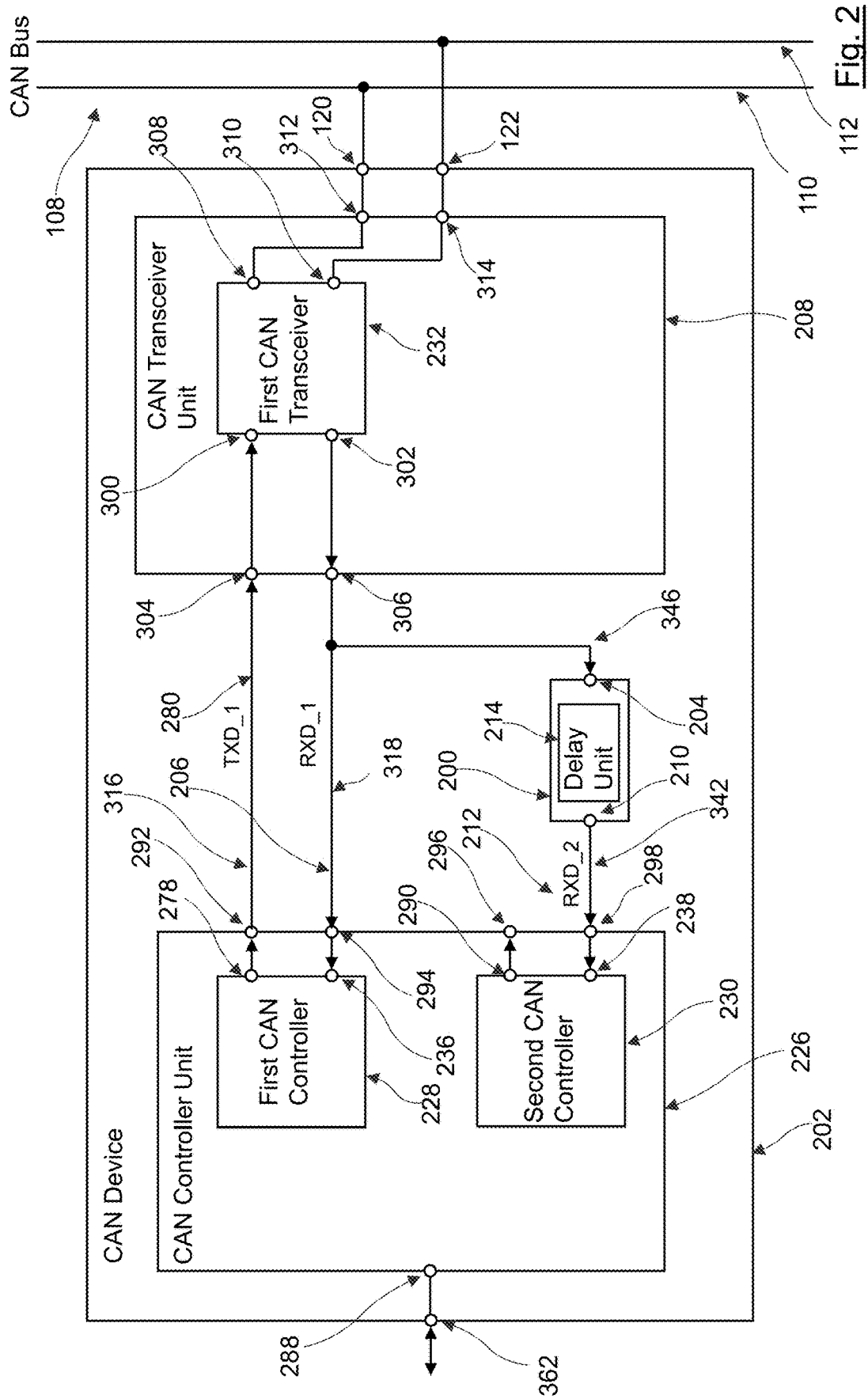
FIGS. 2 and 7 each show a simplified block diagram of a CAN device.

In FIG. 2, an example of a CAN device 202 is schematically shown in detail. Each CAN device 102, 104, 106 of FIG. 1 can be formed by a CAN device 202 of FIG. 2. The CAN device 202 may have implemented Classical CAN, CAN FD and/or CAN XL. The CAN device 202 comprises a CAN controller unit 226 and a CAN transceiver unit 208. The CAN device 202 further comprises a delay module 200.

The CAN controller unit 226 includes a first CAN controller 228 and a second CAN controller 230. The first and second CAN controllers 228, 230 may be identically configured. The following explanations regarding the first CAN controller 228 may apply in an analogous manner to the second CAN controller 230.

The first CAN controller 228 may have implemented Classical CAN, CAN FD and/or CAN XL. For implementing the respective CAN protocol, the first CAN controller 228 may have a microcontroller by which the respective protocol is implemented. The first CAN controller 228 comprises a first transmit data, TXD, interface 278. Via the first TXD interface 278, the first CAN controller 228 may transmit a TXD signal 280 ("TXD_1"). The TXD signal 280 may represent one or more CAN frames. Each CAN frame comprises a plurality of bits, each representing either a logical "0" or a logical "1". The bits are transmitted by means of the TXD signal 280 in the form of a bit stream. A sequence of a plurality of bits and/or a sequence of a plurality of CAN frames may therefore be represented by the TXD signal 280. The first CAN controller 228 also includes a first receive data, RXD, interface 236. The first RXD interface 236 may allow the first CAN controller 228 to receive a first RXD signal 206 ("RXD_1"). The first RXD signal 206 may represent one or more CAN frames. As previously discussed, each CAN frame may comprise a plurality of bits. The bits are transmitted by means of the first RXD signal 206 in the form of a bit stream. A sequence of a plurality of bits and/or a sequence of multiple CAN frames may therefore be represented by the first RXD signal 206.

At the second CAN controller 230, the associated TXD interface is referred to as the second TXD interface 290 and the associated RXD interface is referred to as the second RXD interface 238. Via the second RXD interface 238, the second CAN controller 230 can receive an RXD signal, which is referred to as a second RXD signal 212 ("RXD_2"). In principle, the second CAN controller 230 may send a second TXD signal via the second TXD interface 290. Preferably, however, the second CAN controller 230 is used in such a way that the second CAN controller 230 does not generate a TXD signal, and in particular does not transmit the second TXD signal.

The CAN controller unit 226 may include a TXD interface 292 connected to the first TXD interface 278 of the first CAN controller 228. In an example, the TXD interface 292 may be formed by the first TXD interface 278 of the first CAN controller 228 (not shown). When referring to the first TXD interface 278, such reference may refer to either the first TXD interface 278 of the first CAN controller 228 and/or to the TXD interface 292 of the CAN controller unit 226.

The CAN controller unit 226 may include an RXD interface 294 connected to the first RXD interface 236 of the first CAN controller 228. In an example, the RXD interface 294 may be formed by the first RXD interface 236 of the first CAN controller 228 (not shown). When referring to the first RXD interface 236, such reference may refer to either the first RXD interface 236 of the first CAN controller 228 and/or the RXD interface 294 of the CAN controller unit 236.

The CAN controller unit 226 may include another TXD interface 296 connected to the second TXD interface 290 of the second CAN controller 230. In an example, the TXD interface 296 may be formed by the second TXD interface 290 of the second CAN controller 230 (not shown). When referring to the second TXD interface 290, such reference may refer to either the second TXD interface 290 of the second CAN controller 230 and/or the TXD interface 296 of the CAN controller unit 226.

The CAN controller unit 226 may include another RXD interface 298 connected to the second RXD interface 238 of the second CAN controller 230. In an example, the RXD interface 298 may be formed by the second RXD interface 238 of the second CAN controller 230 (not shown). When referring to the second RXD interface 238, such reference may refer to either the second RXD interface 238 of the second CAN controller 230 and/or the RXD interface 298 of the CAN controller unit 236.

The CAN transceiver unit 208 of the CAN device 202 comprises the first CAN transceiver 232. The first CAN transceiver 232 comprises a TXD interface 300, referred to as the third TXD interface 300. The third TXD interface 300 allows the first CAN transceiver 232 to receive the first TXD signal 280. The first CAN transceiver 232 further comprises an RXD interface 302, referred to as the third RXD interface 302. The first CAN transceiver 232 is configured to send the first RXD signal 206 via the third RXD interface 302.

CAN transceiver unit 208 may include another TXD interface 304 connected to the third TXD interface 300 of the first CAN transceiver 232. In an example, the TXD interface 304 may be formed by the third TXD interface 300 of the first CAN transceiver 232 (not shown). When referring to the third TXD interface 300, such reference may be to either the third TXD interface 300 of the first CAN transceiver 232 and/or the TXD interface 304 of the CAN transceiver unit 208.

The CAN transceiver unit 208 may include another RXD interface 306 connected to the third RXD interface 302 of the first CAN transceiver 232. In an example, the RXD interface 306 may be formed by the third RXD interface 302 of the first CAN transceiver 232 (not shown). When referring to the third RXD interface 302, this reference may refer to either the third RXD interface 302 of the first CAN transceiver 232 and/or the RXD interface 306 of the CAN transceiver unit 208.

The first CAN transceiver 232 includes a first CAN BUS interface 308 and a second CAN BUS interface 310. The first CAN transceiver 232 is preferably configured to generate a CAN bus signal based on the first TXD signal 280. The CAN bus signal is a differential voltage signal that can be generated by the first CAN transceiver 232 at the first and second CAN BUS interfaces 308, 310. When the first CAN transceiver 232 receives the first TXD signal 280 representing the at least one (1) bit, the first CAN transceiver 232 will generate the CAN bus signal based on the first TXD signal 280 such that the CAN bus signal represents the at least one (1) bit as well. Often, the first TXD signal 280 represents a sequence of bits in the form of a bit stream. In this case, the CAN bus signal may be generated by the first CAN transceiver 232 such that the CAN bus signal also represents the sequence of bits.

The first CAN BUS interface 308 of the first CAN transceiver 232 may be connected to the first CAN bus line 110 of the CAN bus 108. The connection between the first CAN BUS interface 308 and the first CAN bus line 110 may be established via at least one further interface 312, 120. The CAN transceiver unit 208 may include the further interface 312. In an example, the first CAN BUS interface 308 of the first CAN transceiver 232 may be connected to the interface 312, which may be connected to the first device interface 120 of the CAN device 202. The first device interface 120 may be connected to and/or configured to be connected to the first CAN bus line 110.

The second CAN BUS interface 310 of the first CAN transceiver 232 may be connected to the second CAN bus line 112 of the CAN bus 108. The connection between the second CAN BUS interface 310 and the second CAN bus line 112 may be established via at least one further interface 314, 122. The CAN transceiver unit 208 may include a further interface 314. In an example, the second CAN BUS interface 310 of the first CAN transceiver 232 may be connected to the interface 314, which may be connected to the second device interface 122 of the CAN device 202. The second device interface 122 may be connected to and/or adapted to be connected to the second CAN bus line 112.

Figure 3:
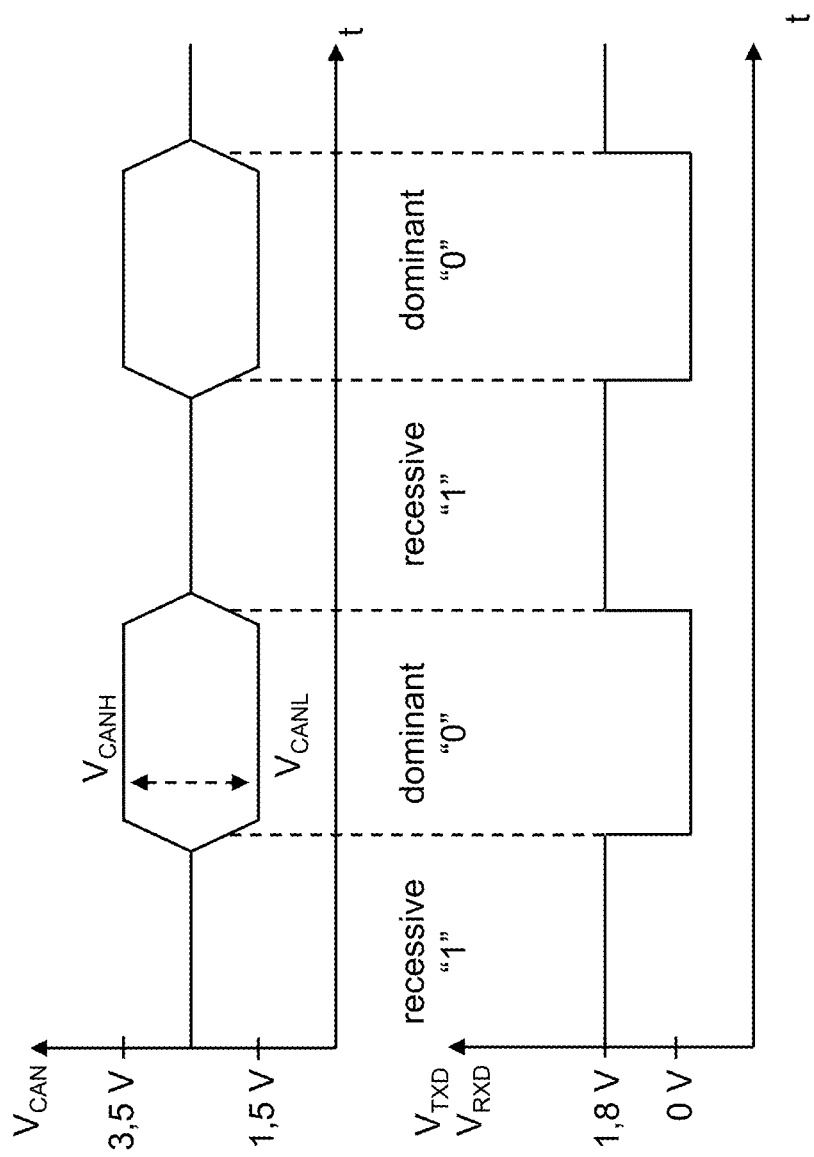
FIGS. 3 to 6 shows a simplified signal charts.

FIG. 3 schematically shows an example of a signal waveform of a CAN bus signal as a differential voltage signal $V_{CAN}$. The differential voltage signal is composed of the first voltage signal $V_{CANL}$ and the second voltage signal $V_{CANH}$. If the first voltage signal $V_{CANL}$ and the second voltage signal $V_{CANH}$ are at the same level, preferably at 2.5 V, this state represents the logical bit "1", which is also referred to as a recessive bit or recessive bit "1". If the first voltage signal $V_{CANL}$ is at a low level, preferably about 1.5 V, and the second voltage signal $V_{CANH}$ is at a high level, preferably about 3.5 V, this state represents logic bit "0", which is also referred to as dominant bit or dominant bit "0".

The first CAN transceiver 232 is configured to detect the CAN bus signal of the CAN bus 108 via the first and second CAN BUS interfaces 308, 310. The first CAN transceiver 232 is further configured to generate and transmit the first RXD signal 206 via the third RXD interface 302 based on the detected CAN bus signal. In an example, if the CAN bus signal shown schematically in FIG. 3 is generated on the CAN bus 108, the first CAN transceiver 232 may generate the RXD signal also shown schematically in FIG. 3 as the first RXD signal 206.

FIG. 3 schematically shows an example of the signal of the RXD signal $V_{RXD}$. If the RXD signal $V_{RXD}$ is at a first signal level, which is also referred to as a recessive signal level, then the RXD signal $V_{RXD}$ or the first signal level represents the logical bit "1", which is also referred to as a recessive bit or recessive bit "1". If the RXD signal $V_{RXD}$ is at a second signal level, which is also referred to as the dominant signal level, then the RXD signal or the second signal level represents the logical bit "0", which is also referred to as the dominant bit or the dominant bit "0". The recessive signal level of the RXD signal $V_{RXD}$ may be between 1.5 V and 6 V, preferably with an allowable deviation of less than 0.2 V. In an example, recessive signal level of the RXD signal $V_{RXD}$ may be 1.8 V, 3.3 V or 5 V, in each example preferably with an allowable deviation of less than 10%. The dominant signal level of the RXD signal $V_{RXD}$ may be 0 V in an example, with an allowable deviation of less than 0.2 V. As can be seen from FIG. 3, a sequence of bits can be represented via the RXD signal $V_{RXD}$. The first CAN transceiver 232 may be used to convert a CAN bus signal of the CAN bus 108 to the first RXD signal 206.

In principle, the first CAN transceiver 232 can also be used to convert the first TXD signal 280 into a CAN bus signal in the form of a differential voltage signal between the first and second CAN BUS interfaces 308, 310.

The example for the signal waveform of the RXD signal $V_{RXD}$ from FIG. 3 can also be understood in an analogous way as an example for a signal waveform of a TXD signal $V_{TXD}$. If the TXD signal $V_{TXD}$ is at a first signal level, which is also referred to as a recessive signal level, then the TXD signal $V_{TXD}$ or the first signal level represents the logical bit "1", which is also referred to as a recessive bit or recessive bit "1". If the TXD signal $V_{TXD}$ is at a second signal level, which is also referred to as the dominant signal level, then the TXD signal or the second signal level represents the logical bit "0", which is also referred to as the dominant bit or the dominant bit "0". The recessive signal level of the TXD signal $V_{TXD}$ may be between 1.5 V and 6 V, preferably with a permissible deviation of less than 0.2 V. In an example, recessive signal level of the TXD signal $V_{TXD}$ may be 1.8 V, 3.3 V or 5 V, in each example preferably with an allowable deviation of less than 10%. The dominant signal level of the TXD signal $V_{TXD}$ can be 0 V in an example, with a permissible deviation of less than 0.2 V. As can be seen from FIG. 3, a sequence of bits can be represented via the TXD signal $V_{TXD}$. The first CAN transceiver 232 may be used to convert the TXD signal 280 into a CAN Bus Signal for the CAN bus 108.

Referring to FIG. 2, it was previously explained that the CAN device 202 includes the CAN transceiver unit 208 and the CAN controller unit 226.

Preferably, the first TXD interface 278 of the first CAN controller 228 is connected to the third TXD interface 300 of the first CAN transceiver 232 via a first signal connection 316. In an example, the first signal connection 316 may extend from the first TXD interface 278 through the interface 292 and the interface 304 to the third TXD interface 300. The first signal connection 316 may allow the first CAN controller 228 to transmit the first TXD signal 280 from the first TXD interface 278 to the third TXD interface 300 of the first CAN transceiver 232.

Preferably, the third RXD interface 302 of the first CAN transceiver 232 is connected to the first RXD interface 236 of the first CAN controller the 228 via a second signal connection 318. In an example, the second signal connection 318 may extend from the third RXD interface 302 through the interface 306 and the interface 294 to the first RXD interface 236. The second signal connection 316 may allow the first CAN transceiver 232 to transmit the first RXD signal 206 from the third RXD interface 302 to the first RXD interface 236 of the first CAN controller 228.

The first CAN controller 228 may have implemented Classical CAN, CAN FD and/or CAN XL. Each of these three protocols requires that a CAN frame terminates with an EOF field. The EOF field consists of a predetermined number of recessive bits, preferably exactly seven recessive bits.

Figure 4:
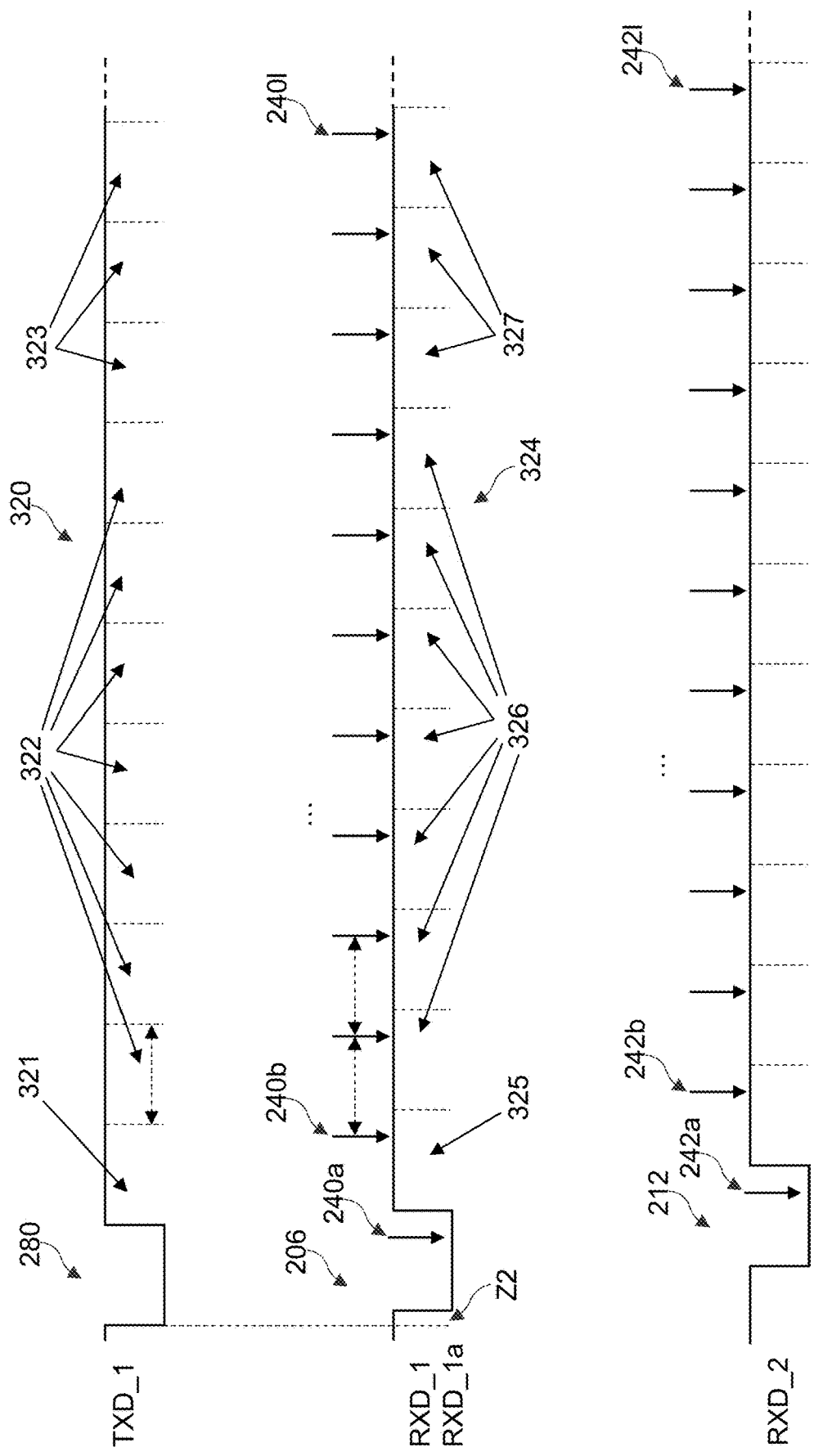

FIG. 4 schematically illustrates an example of a portion of a first TXD signal 280 representing an end portion of a CAN frame. The end portion of the CAN frame includes the Acknowledge Delimiter Field (ADL) bit 321 and the associated EOF field 320, which in this example comprises a sequence of seven recessive bits 322. Additionally, the first TXD signal 280 represents three more recessive bits 323 that follow the EOF field as intermission bits 323. By the end of the time while the eleven recessive bits 322 (the ADL bit 321, the bits of the EOF field 320, and the following intermission bits 323) are being transmitted via the CAN bus 108 by means of a CAN bus signal, the CAN bus 108 reaches an idle state and/or turns into the idle state. The idle state of the CAN bus 108 preferably exists once a CAN bus signal of the CAN bus 108 represents a sequence of at least a predetermined number of recessive bits, preferably a sequence of at least eleven recessive bits. The idle state of the CAN bus 108 may be maintained if the CAN bus signal of the CAN bus represents further recessive bits following the sequence of the predefined number of recessive bits. In an example, the idle state may last longer if a plurality of recessive bits follow the aforementioned sequence of recessive bits. The idle state may be very short in another example if at least one dominant bit directly follows the aforementioned sequence with the predefined number of recessive bits.

FIG. 4 also schematically illustrates an example of a portion of a first RXD signal 206 representing an end portion of a CAN frame. The first RXD signal 206 may be caused by the example of the previously mentioned first TXD signal 280. The end portion of the CAN frame represented by the first RXD signal 206 therefore also includes an ADL bit 325 and an EOF field 324. The EOF field 324 is directly followed by a sequence of intermission bits 327, which are also represented by the first RXD signal 206. The sequence of intermission bits may consists of three bits. Each intermission bit 327 is a recessive bit. The EOF field 324 consists in this example of a sequence of seven recessive bits 326. Consequently, the first RXD signal 206 may represent a combined sequence of at least eleven recessive bits, where the end of last bit of this sequence indicates the start of an idle state of the CAN bus 108.

The first CAN controller 228 is preferably configured to periodically sample the first RXD signal 206. At each sampling, the current value of the first RXD signal 206 is detected. A value of an RXD signal, in particular the first RXD signal 206, detected by sampling may also be referred to as a bit value. The sampling timing may be synchronized to a falling edge of the RXD signal, in particular the first RXD signal 206. The time interval between the points in time for sampling preferably corresponds to the duration of a bit represented by the RXD signal. The time interval may be predefined.

In FIG. 4, each sampling of bit value of the first RXD signal 206 is schematically represented by an arrow symbol. In the example of FIG. 4, the first RXD signal 206 represents a CAN frame whose end portion comprises a sequence of eight recessive bits. The first RXD signal 206 also represents a directly following sequence of three recessive bits 327, which are intermission bits 327. As the first CAN controller 228 samples the first RXD signal, in particular samples it periodically, the first CAN controller 228 will sample a sequence of eleven recessive bit values 240b-240l at and following the end of the CAN frame. The end of this sequence of eleven recessive bit values 240b-240l represent the start of an idle state of the CAN bus 108. The first CAN controller 228 is preferably configured to detect a sequence of at least eleven sampled recessive bit values 240b-240l of the first RXD signal 206 and caused by a positive detection of said sequence to detect a first idle state 216 of the CAN bus 108.

In FIG. 4, the bits of the CAN frame represented by the first RXD signal 206 are delayed with respect to the bits of the identical CAN frame represented by the first TXD signal 280 by a time Z2, referred to as the second delay time Z2. The second delay time Z2 is (at least mainly) caused by the first CAN transceiver 232.

Each CAN device 102, 104, 106 of the CAN system 100 (see FIG. 1) may be configured according to the CAN device 202. When the first CAN controller 228 of the CAN controller unit 226 of the first CAN device 102 generates a first TXD signal 280 representing a CAN frame, the last portion of which is schematically shown in FIG. 4, the first CAN transceiver 232 of the CAN transceiver unit 208 of the first CAN device 102 will generate the first RXD signal 206 (see FIG. 4) and also generate a CAN bus signal on the CAN bus 108 representing the bits of the CAN frame in the form of a bit sequence (or bit stream).

Figure 5:
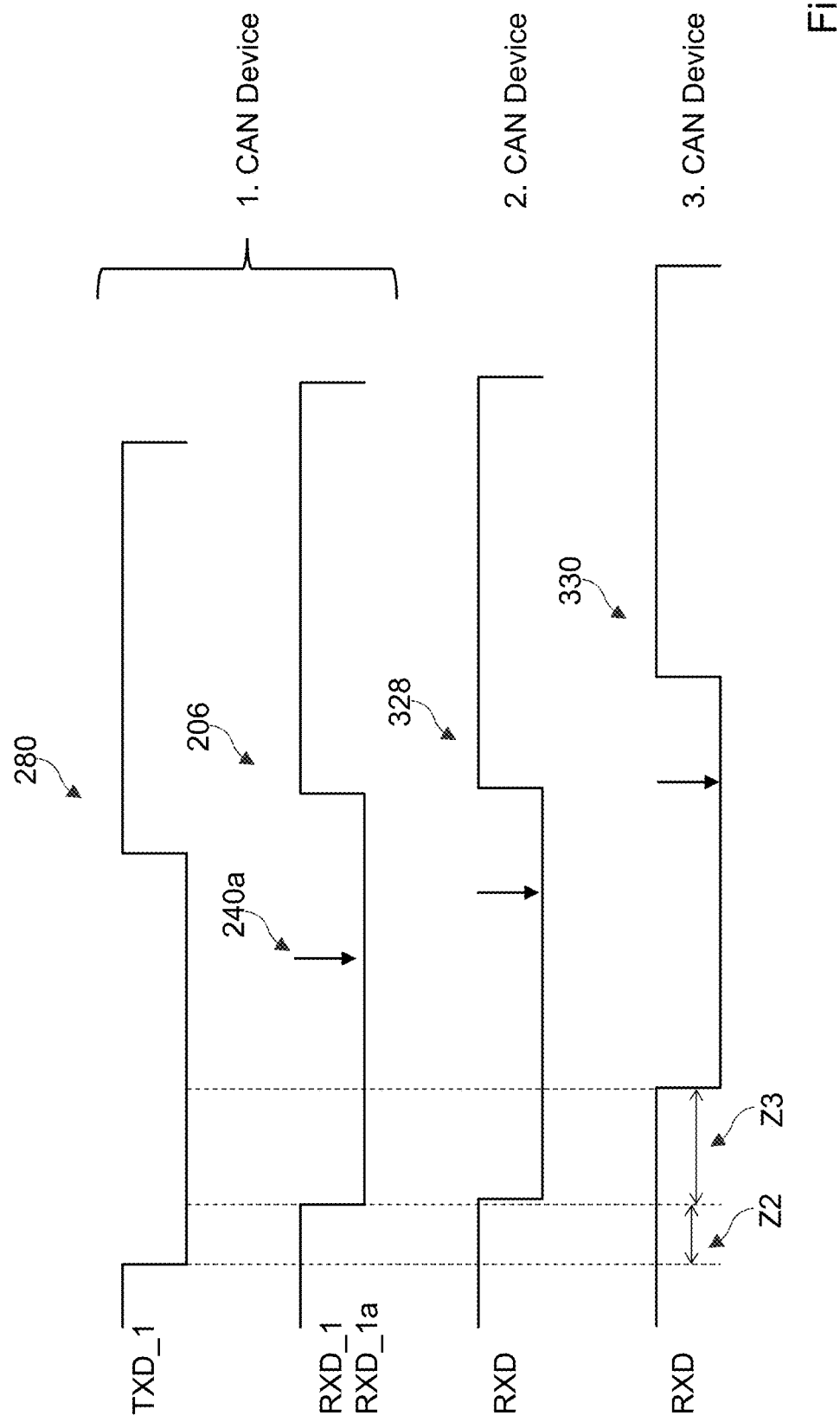

The CAN bus signal is received by the first CAN transceiver 232 of the CAN transceiver unit 208 of the second CAN device 104 and is converted into an RXD signal 328("RXD_1", "RXD_1a")), which also represents the bits of the CAN frame. In FIG. 5, a portion of the RXD signal 328 generated by the first CAN transceiver 232 of the CAN transceiver unit 208 of the second CAN device 104 is schematically shown. Referring to FIG. 1, it is assumed that the second CAN device 104 has a small distance to the first CAN device 102. Due to this small distance, the bits of the CAN frame represented by the RXD signal 328 are delayed by approximately the same second delay time Z2 with respect to the bits of the identical CAN frame represented by the first TXD signal 280.

The CAN bus signal is also received by the first CAN transceiver 232 of the CAN transceiver unit 208 of the third CAN device 106 and converted into an RXD signal 330, which also represents the bits of the CAN frame. In FIG. 5, a portion of the RXD signal 330 generated by the first CAN transceiver 232 of the CAN transceiver unit 208 of the third CAN device 106 is schematically shown. With reference to FIG. 1, it is assumed that the third CAN device 106 has a large distance to the first CAN device 102. Due to the large distance, the bits of the CAN frame represented by the RXD signal 330 are delayed relative to the bits of the identical CAN frame represented by the first TXD signal 280 by both second delay time Z2 and a further time, referred to as third delay time Z3. The third delay time Z3 is caused by the length of each of the two CAN bus lines 110, 112 (between the CAN bus devices 102, 106).

Figure 6:
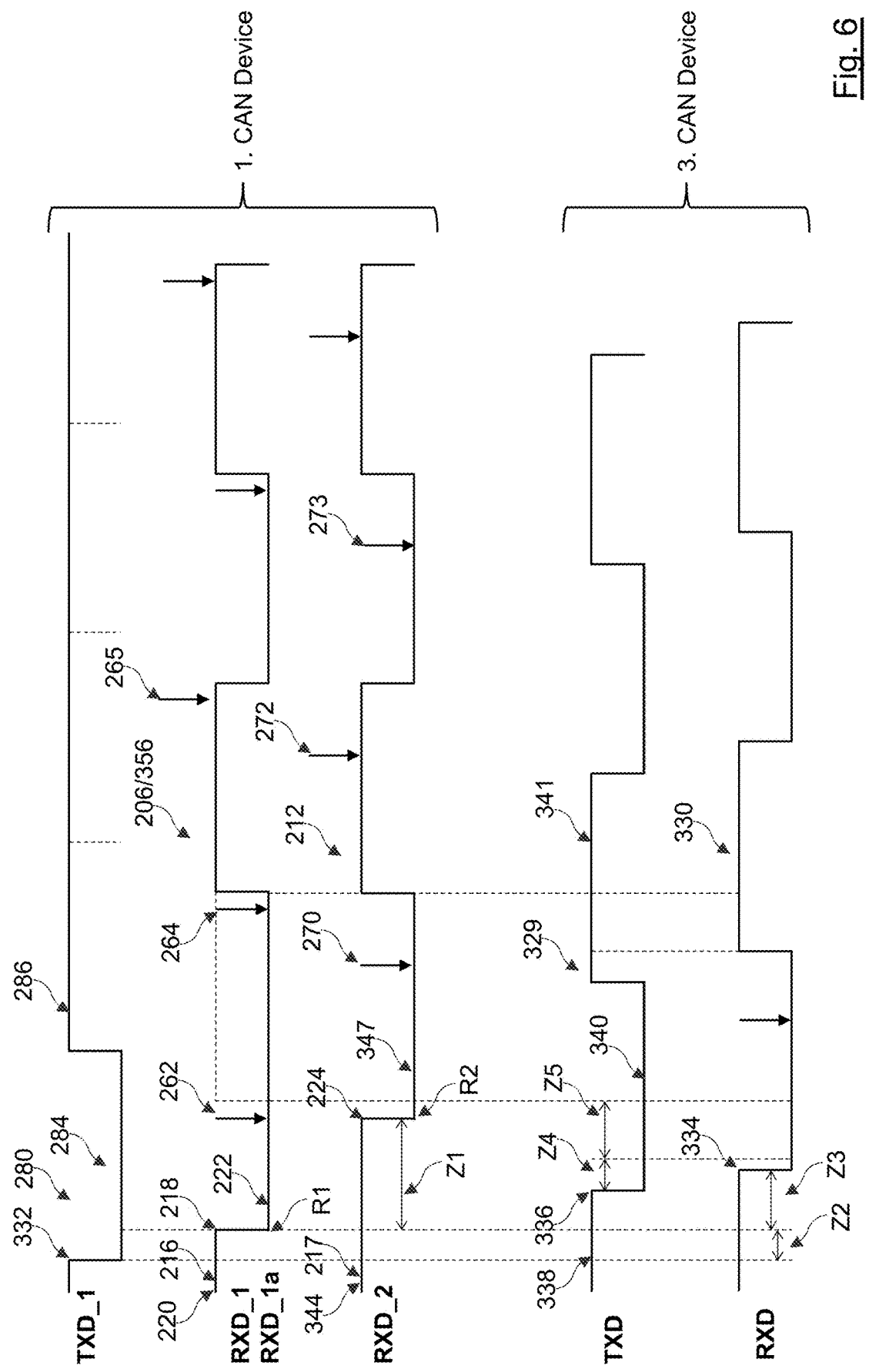

FIG. 6 schematically illustrates another example of a portion of the signal waveforms of the first TXD signal 280 and the first RXD signal 206 that may be generated in the first CAN device 102. It is assumed that the first CAN controller 228 of the CAN controller unit 226 of the first CAN device 102 detects a first idle state 216 of the CAN bus 108 based on the first RXD signal 206. Once the first idle state 216 becomes present or if the first idle state 216 is present for some time, the first CAN controller 228 of the CAN controller unit 226 of the first CAN device 102 may begin to send a new CAN frame via the first TXD signal 280. The first bit of the new CAN frame is a dominant bit 284, also referred to as the start of frame bit 284 or SOF bit 284 of the new CAN frame. The SOF bit 284 generates a signal change, referred to as the third signal change 332, from a recessive signal level of the first TXD signal 280 to a dominant signal level of the first TXD signal 280. Delayed by the second time delay Z2, a corresponding signal change, referred to as the first signal change 218, occurs in the first RXD signal 206. At the first signal change 218, the first RXD signal 206 changes from the recessive signal level 220 to the dominant signal level 222. Delayed by the additional third time delay Z3, a signal change referred to as the fourth signal change 334 is also caused in the RXD signal 330 generated by the first CAN transceiver 232 of the CAN transceiver unit 208 of the third CAN device 106 due to the CAN bus signal.

The cumulative delay from the second delay time Z2 and the third delay time Z3 causes the third CAN device 106 to delay detecting that the first CAN device 102 has already started sending a new CAN frame. In a worst case scenario, the third CAN device 106 may also start sending another new CAN frame during the period of the third delay time Z3, resulting in a fifth signal change 336 in the TXD signal 329 of the third CAN device 106. Theoretically, the fifth signal change 336 would result in a signal change in the RXD signal 230 of the third CAN device 106 delayed by the delay time Z4, which is also referred to as the fourth delay time Z4. However, in the example of FIG. 6, the fourth signal change 334 caused by the signal change 332 in the first TXD signal 280 of the first CAN device 102 has already occurred previously. As a result, a situation may arise in which two different CAN devices 102, 106 attempt, at least overlapping in time, to transmit a CAN frame over a CAN bus signal on the CAN bus 108. During the sampling of the RXD signal 330 of the third CAN device 106, this situation is initially not noticeable. However, said situation leads to a relevant distortion of the first RXD signal 206 of the first CAN device 102. The fifth signal change 336 from the recessive signal level 338 to the dominant signal level 340 of the TXD signal 329 of the third CAN device 106 has a delayed effect on the first RXD signal 206 of the first CAN device 102 by the fourth time delay Z4 and by a further fifth time delay Z5, so that also the dominant signal level 340 of the TXD signal 329 of the third CAN device 106 causes the dominant signal level 222 of the first RXD signal 206 of the first CAN device 102. The fifth time delay Z5 is caused by the assumed long length of the two CAN bus lines 110, 112 (between the CAN devices 102, 106). The dominant signal level 222 of the first RXD signal 206, which was initially caused by the third signal change 332 of the first TXD signal 280 of the first CAN device 102 following the first signal change 218, is extended by the dominant signal level 340 of the TXD signal 329 of the third CAN device 106. In the example of FIG. 6, the first bit value 262 and the second bit value 264 sampled by sampling subsequent to the first signal change 218 and/or the third signal change 332 each represent a dominant bit, even though neither the first TXD signal 280 of the first CAN device 102 nor the TXD signal 329 of the third CAN device 106 intended to send two consecutive dominant bits (as the first two bits).

Against this background, there is a need to provide a way to prevent corruption of the reconstructed bits of a CAN frame when the distance between two CAN devices in a CAN system 100 is particularly large while maintaining a high transmission rate.

As previously explained, corruption of the bits of a CAN frame to be reconstructed may occur. The corruption appears in a dominant signal level 222 of the first RXD signal of the first CAN controller 228, where the duration of the dominant signal level 222 is longer than a predefined time interval, which should be the regular duration of each bit, and thus may overrule in part or completely the recessive level 286.

Therefore, the use of a delay module 200 for the CAN device 202 is proposed. The delay module 200 includes a first module interface 204 for receiving the first RXD signal 206 from the transceiver unit 208. The transceiver unit 208 is configured to be connected to the CAN bus 108. The delay module 200 includes a second module interface 210 for transmitting a second RXD signal 212 ("RXD_2"). Further, the delay module 200 includes a delay unit 214 coupled between the first module interface 204 and the second module interface 210. The delay unit 214 is configured to perform the following steps a) through c):

Step a): the delay unit 214 is configured to detect a first idle state 216 of the CAN bus 108 based on the first RXD signal 206.

Step b): the delay unit 214 is configured to detect, at a first reference time R1 at the end of the first idle state 216, a first signal change 218 from the recessive signal level 220 of the first RXD signal 206 to the dominant signal level 222 of the first RXD signal 206.

Step c): the delay unit 214 is configured to generate a second RXD signal 212 based on the first RXD signal 206 by delaying only the first signal change 218 of the first RXD signal 206 for a predefined first delay time Z1 by means of the delay unit 214, such that the second RXD signal 212 has a second signal change 224 at a second reference time R2 instead of the first signal change 218 at the first reference time R1.

The delay unit may not cause any other change to the first RXD signal 206 to generate the second RXD signal 212.

As a result, the second RXD signal 212 corresponds in the first RXD signal 206 except that the first signal change 218 is delayed in time by the predefined, first delay time Z1 so that the second RXD signal 212 has the second signal change 224 instead of the first signal change 218. The second RXD signal 212 may be used by a CAN controller, such as a second CAN controller 230 of the CAN controller unit 226, to reconstruct the bits of a CAN frame without error. As can be seen schematically from FIG. 6, the second RXD signal 212 can be sampled periodically. For example, the first bit value 270 of the second RXD signal 212 represents a dominant bit. The same dominant bit is represented by the dominant signal level 340 of the TXD signal 329 of the third CAN device 106. The second bit value 272 of the second RXD signal 212 a recessive bit. The same recessive bit value is represented by the recessive signal level 341 of the TXD signal 329 of the third CAN device 106. Consequently, the bits represented by the TXD signal 329 can be reconstructed without error by the second RXD signal 212.

FIG. 2 schematically illustrates an example of an arrangement of the delay unit 200 in a CAN device 202. The first module interface 204 of the delay unit 200 is used to receive the first RXD signal 206. For this purpose, the first module interface 204 may be connected to the third RXD interface 302 of the first CAN transceiver 232, in particular via the RXD interface 306 of the CAN transceiver unit 208. Through the corresponding connection, the first CAN transceiver 232 also sends the first RXD signal 206 to the first module interface 204.

The delay unit 214 of the delay module 200 may be configured to receive the first RXD signal 206. The delay unit 214 may further be configured to periodically sample the first RXD signal 206. At each sampling, the current value of the first RXD signal 206 is detected. The time interval between sampling instants preferably corresponds to the duration of a bit represented by the RXD signal. In the center of FIG. 4, each sampling of the first RXD signal 206 is schematically represented by an arrow symbol. The timing of the samples may be synchronized to a falling edge of the RXD signal, in particular the first RXD signal 206. In the example of FIG. 4, the first RXD signal 206 represents a CAN frame whose end portion comprises a sequence of eight recessive bits, which form an ADL bit 325 and an EOF field 324 of the CAN frame. Additionally, the first RXD signal 206 represents three more recessive bits 326 that follow the bits of the CAN frame as intermission bits 327. Since the delay unit 214 is preferably configured to sample the first RXD signal 206, in particular to sample it periodically, the delay unit 214 in this example will sample a sequence of eleven recessive bit values 240*b*-240*l* at and following the end of a CAN frame. The end of this sequence of eleven recessive bit values 240*b*-240*l* represents the start of the idle state of the CAN bus 108. The delay unit 214 may be configured to detect a sequence of at least eleven sampled recessive bit values 240*b*-240*l* of the first RXD signal 206 and to detect a first idle state 216 of the CAN bus 108 caused by a positive detection of said sequence.

The delay unit 214 is further configured to detect the first signal change 218. To detect the signal change 218, the delay unit 214 may sample the first RXD signal 206 at a significantly higher sampling rate than explained in the preceding paragraph. Also, in this type of sampling operation, a plurality of samples of the first RXD signal 206 are performed by the delay unit 214, so that the first reference time R1 at which the first signal change occurs can be accurately determined based on the plurality of samples of the first RXD signal 206 by the delay unit 214.

The delay unit 214 is configured to generate the second RXD signal. To generate the second RXD signal 212, the delay unit 212 may be configured to not transition the first RXD signal 206 to the second RXD signal 212, or to transition the first RXD signal 206 to the second RXD signal 212 unchanged, at least during the first delay time Z1 between the occurrence of the first signal change at time R1 and the generation of the second signal change 224 at time R2. During the first delay time Z1, the delay unit 212 may generate a recessive signal level for the second RXD signal 212. The recessive signal level 344 for the second RXD signal 212 during the first delay time Z1 may act as a delay of the first signal change 218 of the first RXD signal 206 to form the second RXD signal 212 with the associated, second signal change 224 at the second reference time R2. The recessive signal level 344 of the second RXD signal 212 during the first delay time Z1 may also have the technical effect of extending the idle state 217 of the second RXD signal 212 relative to the idle state 216 of the first RXD signal 206.

The delay unit 214 may be configured to transmit the second RXD signal 212 through the second module interface 210. In the example of FIG. 2, the second module interface 210 may be coupled to the second RXD interface 238 of the second CAN controller 230, and in particular, a signal connection 342 may extend from the second module interface 210 to the second RXD interface 238 via the further RXD interface 298. In this example, the delay unit 214 may transmit the second RXD signal 212 to the second RXD interface 238 of the second CAN controller 230 via the second module interface 210 and the RXD signal interface 298 using the signal connection 342. The RXD signal interface 298 may be disregarded if the RXD signal interface 298 is formed by the second RXD interface 238 of the second CAN controller 230.

The second CAN controller 230 may be designed identically to the first CAN controller 228. For the second CAN controller 230, reference is therefore made to the preceding explanations, preferred features and/or technical effects in an analogous manner as they have been explained for the first CAN controller 228.

FIG. 2 schematically shows an example of a CAN device 202. The CAN device 202 offers the technical advantage that the CAN device 202 as a first CAN device 102 in a CAN system 100 can communicate both with a further CAN device 104 arranged at a small distance from the first CAN device 102 and with a still further CAN device 106 arranged at a large distance from the first CAN device 102. The communication between the first CAN device 102 and the further, second CAN device 104 arranged at a small distance regularly does not cause a particularly large time delay, so that the communication between the first CAN device 102 and the second CAN device 104 is usually possible without errors. The greater the distance between the first CAN device 102 and the third CAN device 106 becomes, the greater the time delay of the signals exchanged between the first CAN device 102 and the third CAN device 106 via the CAN bus 108 becomes. As previously explained, the delay module 200 can be used to modify a first RXD signal 206 generated in the first CAN device 102 such that a CAN frame transmitted from the third CAN device 106 in the form of a CAN bus signal to the first CAN device 102 can be reconstructed without error. As will become apparent below, a second CAN controller 230 is used to reconstruct this CAN frame. It is noted that each CAN device 102, 104, 106 of a CAN system 100 (see FIG. 1) may be configured according to a CAN device 202 (see FIG. 2).

The CAN device 202 is shown schematically in an example in FIG. 2. As a purely precautionary measure, it is pointed out that a further example of the CAN device 202 is shown schematically in FIG. 7. In the following, however, FIG. 2 will be discussed first.

The CAN device 202 includes the CAN controller unit 226, the CAN transceiver unit 208, and the CAN delay module 200. The CAN controller unit 226 includes the first CAN controller 228 and the second CAN controller 230. The CAN transceiver unit 208 includes at least the first CAN transceiver 232. The first RXD interface 236 of the first CAN controller 228 is coupled to the CAN transceiver unit 208 for receiving the first RXD signal 206. The second RXD interface 238 of the second CAN controller 230 is coupled to the CAN transceiver unit 208 via the delay module 200 to receive the second RXD signal 212.

In an example, the signal connection 318 may extend from the third RXD interface 302 of the first CAN transceiver 232 of the CAN transceiver unit 208 to the first RXD interface 236 of the first CAN controller 228 of the CAN controller unit 226. The signal connection 318 may serve to transmit the first RXD signal 206. Further, a signal connection 346 may extend from the third RXD interface 302 of the first CAN transceiver 232, preferably via the RXD interface 306 of the CAN transceiver unit 208, to the first module interface 204 of the CAN module 200. The signal connection 346 may be used to transmit the first RXD signal 206. The signal connection 346 may be formed in a portion in common with the signal connection 318. It is also possible for the signal connection 346 to extend in a section parallel to the signal connection 318. The first RXD signal 206 may be sent from the first CAN transceiver 232 to both the first RXD interface 236 of the first CAN controller 228 and the first module interface 204 of the delay module 200. The first CAN controller 228 may receive the first RXD signal 206 via the first RXD interface 236. The delay module 200 may also receive the first RXD signal 206 via the first module interface 204.

The delay module 200 generates the second RXD signal 212 based on the first RXD signal 206. Reference is made to the preceding explanations, preferred features, technical effects and advantages in an analogous manner as already explained for the delay module 200.

A further signal connection 342 may extend from the second module interface 210 of the delay module 200, preferably via the further RXD interface 298, to the second RXD interface 238 of the second CAN controller 230. In an example, the further RXD interface 298 may be disregarded if the RXD interface 298 is formed by the second RXD interface 238 of the second CAN controller 230. The signal connection 342 may be used to transmit the second RXD signal 212. The second CAN controller 230 may receive the second RXD signal 212 via the second RXD interface 238.

The first CAN controller 228 is configured to perform the following steps d) to g).

The first CAN controller 228 is configured to sample a plurality of values 240a-240l, 262-265, referred to as bit values 240a-240l, 262-265, of the first RXD signal 206 in step d). With respect to sampling the first RXD signal 206 by means of the first CAN controller 228, reference is made to the preceding explanations, preferred features, and technical effects at least in an analogous manner as already explained for sampling the first RXD signal 206 by means of the first CAN controller 228.

The first CAN controller 228 is configured to detect, in step e), the first idle state 216 of the CAN BUS network 108 based on bit values 240b to 240l from step d). With respect to the detection of the first idle state 216 by means of the first CAN controller 228 and based on sampled bit values 240a-240l, reference is made to the preceding explanations, preferred features and technical effects at least in an analogous manner as already explained in connection with the detection of the first idle state 216.

The first CAN controller 228 may be configured to detect a first error in step f) if both of the two bit values 262, 264 following the first idle state 216 represent a dominant signal level 222. The first error may be understood as an error in the reconstruction of the bits represented by the first RXD signal 206 and/or the CAN frame represented by the first RXD signal 206. The two bit values 262, 264 following the idle state 216 may be understood as the first two bit values 262, 264 being sampled by means of the first CAN controller 228 in step d) after (following) an end of the first idle state 216. The first idle state 216 ends at the first signal change 218. The two bit values 262, 264 may also be referred to as the next two bit values 262, 264 and/or the first bit value 262 of the first RXD signal 206 and the second bit value 264 of the first RXD signal 206.

When the "CAN protocol" is referred to, at least one of the following protocols is meant: Classical CAN, CAN FD and CAN XL. The CAN protocol can also refer to two of the mentioned protocols or to all three of the mentioned protocols.

According to the CAN protocol, the first bit, called the start-of-frame bit or SOF bit, of a CAN frame is a dominant bit. According to the CAN protocol, the SOF bit is followed in the CAN frame by the second bit, which is a bit of an arbitration field of the CAN frame. Basically, according to the CAN protocol, the second bit of the CAN frame can be a dominant bit or a recessive bit. For the CAN device 202, it is assumed that the second bit of the CAN frame is a recessive bit by definition. This definition may be included in a revision of the CAN protocol. However, it is also possible that the definition applies to each CAN device 102, 104, 106 of a CAN system 100. This definition may be implemented by each CAN controller 228, 230 of a CAN controller unit 226 of a CAN device 202. In an example, the implementation may be a software implementation, a hardware implementation or a combination thereof. As a result of the implementation, each first CAN controller 228 may be configured to generate a first TXD signal 280 only such that the first TXD signal 280 represents a CAN frame such that the first bit (SOF bit) of the CAN frame is a dominant bit and such that the second bit (following the SOF bit) of the CAN frame is a recessive bit. As a result, the first two bits of each CAN frame are predefined as a sequence of a dominant bit and a recessive bit. The analog result is also valid for each CAN frame represented by an RXD signal.

Knowledge that the first two bits of each CAN frame are formed from a sequence of a dominant bit and a subsequent recessive bit is used by the first CAN controller 228 in step f) to detect the first error. In step f), reference is made to the first bit 262 of the first RXD signal 206 and the subsequent, second bit 264 of the first RXD signal 206. In the first RXD signal 206, the first idle state 216 ends with the first signal change 218. With the first signal change 218 from the recessive signal level 220 to the dominant signal level 222, the transmission of a new CAN frame via the first RXD signal 206 begins. In light of the previous explanations, it is to be expected that the first RXD signal 206 following the first idle state 216 (or following the first signal change 218) first represents a dominant bit and subsequently represents a recessive bit.

In the example of FIG. 6, the first bit value 262 of the first RXD signal 206 represents a dominant bit and the subsequent, second bit value 264 of the first RXD signal 206 represents a dominant bit. The sequence of two dominant bit values 262, 264 contradicts the previously explained expectation. In this case, a first error is present in the reconstruction of the CAN frame that could or should be represented by the first RXD signal after the end of the first idle state 216. The first error is caused by the TXD signal 329 of the third CAN device 106. In this example, it is assumed that each CAN device 102, 106 is formed by a CAN device 202 of FIG. 2. The TXD signal 329 of the third CAN device 106 has a fifth signal change 336 that affects the first RXD signal 206 by the fourth delay time Z4 and additionally by the fifth delay time Z5, such that the duration of the dominant signal level 222 of the first RXD signal 206 is extended long enough that in step d) both the first bit value 262 represents a dominant signal level and the second bit value 264 represents a dominant signal level. As a result, a reconstruction error occurs. Reference is made to the preceding explanations, preferred features and technical effects arising from the reconstruction error.

If the first CAN controller 228 detects the first error in step f), then the first CAN controller 228 and/or the CAN controller unit 226 may discard a first CAN frame if the first CAN controller 228 should have generated the first CAN frame based on the bit values 262-265 after the first idle state 216. The first CAN controller 228 may be configured to cancel reconstruction of the first CAN frame based on the bit values 262-265 of the first RXD signal 206 if the first CAN controller 228 detects the first error.

The first CAN controller 228 may be configured to cancel a transmission of the first TXD signal 280 if and when the first CAN controller 228 detects the first error. The interruption of the transmission the first TXD signal 280 may also be caused by an arbitration that the first CAN controller 228 may perform in an initial phase of sending the first TXD signal 280. For example, if the arbitration causes the first CAN controller 228 to determine that the second bit 264 of the first RXD signal 206 does not correspond to the bit 286 of the first TXD signal, the first CAN controller 228 may thereby determine the arbitration to be lost and may stop sending the first TXD signal 280 due to the lost arbitration.

The first CAN controller 228 is configured to generate the first RXD frame in step g) based on bit values 262-265 of the first RXD signal 206 that follow after the first idle state 216 if the first error is not detected. The bit values 262-265 are not limited to the three bit values 262-265 shown in FIG. 6, but may be representative of a plurality of a sequence of bit values following the first idle state 216.

As a result, the first CAN controller 228 may then generate the first RXD frame in step g) if the first CAN controller 228 samples a first bit value 262 representing a dominant bit following the first idle state 216 and then samples a second bit value 264 representing a recessive bit. In this case, it is assumed that the first error or corresponding reconstruction error is not present for a reconstruction of a CAN frame that may be represented by the first RXD signal 206 following the first idle state 216.

FIG. 6 schematically illustrates an example in which both the first bit value 262 and the second bit value 264 each represent a dominant bit. The first CAN controller 228 will therefore detect the first error in step f). The generation of the first RXD frame according to step g) will only occur if the first error was not detected in step f). As a result, the first CAN controller 228 will not generate the first RXD frame according to step g). The generation of the first RXD frame according to step g) would also not make sense, since a reconstruction error would exist.

The second CAN controller 230 is configured to execute the following steps h) to k). Steps h) to k) can be independent of steps d) to g), or vice versa, so that both groups of steps can be executed at least partially in parallel in terms of time.

The second CAN controller 230 is configured to sample, in step h), a plurality of values 242a-242l, 270-273, referred to as bit values 242a-242l, 270-272, of the second RXD signal 212. With respect to sampling the second RXD signal 212 by means of the second CAN controller 230, reference is made to the preceding explanations, preferred features and technical effects in at least an analogous manner as already explained for sampling the first RXD signal 206 by means of the first CAN controller 228.

The second CAN controller 230 is configured to detect, in step i), the second idle state 217 of the CAN BUS network 108 based on the bit values 242b to 242l from step h). With respect to the detection of the second idle state 217 by means of the second CAN controller 230 and based on the sampled bit values 242b-242l, reference is made to the preceding explanations, preferred features and technical effects at least in an analogous manner as already explained in connection with the detection of the first idle state 216 by means of the first CAN controller 228.

The second CAN controller 230 is configured to detect a second error in step j) if each of the two bit values 270, 272 following the second idle state 217 represent a dominant signal level 347. The second error may be understood as an error in the reconstruction of the bits represented by the second RXD signal 212 and/or the CAN frame represented by the second RXD signal 212. The two bit values 270, 272 following the second idle state 217 may be understood as the first two bit values 270, 272 sampled as the next two bit values 270, 272 by means of the second CAN controller 230 in step h) after the end of the second idle state 217. The second idle state 217 ends with the second signal change 224. The two bit values 270, 272 may also be referred to as the next two bit values 270, 272 and/or the first bit value 270 of the second RXD signal 212 and the second bit value 272 of the second RXD signal 212.

Previously a definition was introduced. According to the definition, the first two bits of each CAN frame are predefined, namely as a sequence of a dominant bit and a recessive bit. The knowledge that the first two bits of each CAN frame are formed by a sequence of a dominant bit and a subsequent recessive bit is used by the second CAN controller 230 in step j) to detect the second error. In step j), reference is made to the first bit 270 of the second RXD signal 212 and the subsequent, second bit 272 of the second RXD signal 212. In the second RXD signal 212, the second idle state 217 ends with the second signal change 224. With the second signal change 224 from the recessive signal level 344 to the dominant signal level 347, the transmission of a new CAN frame via the second RXD signal 212 begins. In light of the previous explanations, it is to be expected that the second RXD signal 212, following the second idle state 217 (or following the second signal change 224), first represents a dominant bit and subsequently represents a recessive bit.

In the example shown in FIG. 6, the first bit value 270 of the second RXD signal 212 represents a dominant bit and the subsequent, second bit value 272 of the second RXD signal 212 represents a recessive bit. The sequence of a dominant bit value 270 and a subsequent, recessive bit value 272 corresponds to the previously explained expectation. In this case, therefore, there is no second error in the reconstruction of the CAN frame that could or should be represented by the second RXD signal 212 after the end of the second idle state 217.

FIG. 6 shows an example of the signal forms of the signals from the first CAN device 102 and the third CAN device 106 if the third CAN device 106 is located at a large distance from the first CAN device 102. Due to the large distance between the two CAN devices 102, 106, the first CAN controller 228 of the CAN controller unit 226 of the first CAN device 102 may receive a first RXD signal 206, where the first CAN controller 228 samples first RXD signal 206 and detects a first error based on the resulting bit values 262, 264. Due to the first error, error-free reconstruction of a CAN frame is not possible in this example. If the first error is detected by the first CAN controller 228, the first CAN controller 228 may cancel transmission of a CAN frame using the first TXD signal 280. The third CAN device 106, and in particular the associated first CAN controller, may continue sending the TXD signal 329. Due to the canceled, first TXD signal 280 and due to the continued transmission of the TXD signal 329 by means of the third CAN device 106, the result is that the bit values 340, 341 of a CAN frame represented by the TXD signal 329 can be reconstructed by sampling the bit values 270, 272, 273 of the second RXD signal 212 (in step h)). As a result, by means of the second CAN controller 230 of the first CAN device 102, it is possible to receive without error the bits of a CAN frame sent via a CAN bus signal from a remote, third CAN device 106.

In connection with FIG. 6, an example with multiple signal forms was previously explained. In the example, the first CAN controller 228 detects a first error, whereas the second CAN controller does not detect the second error. In particular, the first error was caused by a start of sending the TXD signal 329 by means of the third CAN device 106 being timed moderately after a start of sending the first TXD signal 280 by means of the first CAN device 102. If the start of the transmission of the first TXD signal 280 and the start of the transmission of the TXD signal 329 are significantly further apart in time (not shown in FIG. 6), a different temporal relationship may arise. This different temporal relationship may result in no first error being detected by the first CAN device 228, whereas a second error may be detected by the second CAN device 230. If no first error is detected by the first CAN device 228, it is possible that the first CAN device 228 generates an error-free, first RXD frame based on the sampled bit values of the first RXD signal 206. If the second error is detected by the second CAN device 230, it is not possible for the second CAN device 230 to reconstruct an error-free RXD frame.

Against this background, the second CAN controller 230 is configured to perform steps j) and k). By means of these steps, the second CAN controller 230 can determine whether a second error exists or whether otherwise the second RXD frame can be generated.

If the second CAN controller 230 detects the second error in step j), then the second CAN controller 230 and/or the CAN controller unit 226 may discard the second CAN frame if the second CAN controller 230 should have generated the second CAN frame based on the bit values 270, 272, 273 after the second idle state 217. The second CAN controller 230 may be configured to cancel reconstruction of the second CAN frame based on the bit values 270-273 of the second RXD signal 212 if the second CAN controller 230 detects the second error.

The second CAN controller 230 is configured to generate the second RXD frame in step k) based on bit values 270-273 of the second RXD signal 212 following the second idle state 217 if the second error is not detected. The bit values 270-273 are not limited to the three bit values 270-273 shown in FIG. 6, but may be representative of a plurality of a sequence of bit values following the second idle state 217.

As a result, the second CAN controller 230 may then generate the second RXD frame in step k) if the second CAN controller 230 samples a first bit value 270 representing a dominant bit following the second idle state 217 and then samples a second bit value 272 representing a recessive bit. In this case, it is assumed that the second error or corresponding reconstruction error is not present for a reconstruction of a CAN frame that may be represented by the second RXD signal 212 following the second idle state 217.

FIG. 6 schematically illustrates an example in which the first bit value 270 of the second RXD signal 212 represents a dominant bit and the second bit value 272 of the second RXD signal 212 represents a recessive bit. Therefore, after the idle state 217, the second RXD signal 212 represents a second CAN frame, where the first bit of the second CAN frame is a dominant bit and the second bit of the second CAN frame is a recessive bit. The first two bits of the second CAN frame are therefore formed by a sequence of a dominant bit and a recessive bit. This sequence of the two bits fulfills the expectation according to the definition explained earlier. From the fact that the first two bits satisfy the expectation, it follows that the second CAN controller 230 will not detect the second error in step j) and that the second CAN controller 230 can generate the second RXD frame in step k).

Previously, it was explained that the first CAN controller 228 may generate a first RXD frame if the first error was not detected, and that the second CAN controller 230 may generate a second RXD frame if the second error was not detected. As a result, the first RXD frame, the second RXD frame, or even both RXD frames (i.e., the first RXD frame and the second RXD frame) may be generated depending on whether and, if so, which of the two errors is not detected. Against this background, it is of advantage to decide which of the RXD frames is selected to use that selected RXD frame as a valid RXD frame for further use and/or steps within the CAN device 202. In an example, the CAN controller unit 226 may be configured to select either the first RXD frame or the second RXD frame as a valid RXD frame.

The CAN controller unit 226 comprises the first CAN controller 228 and the second CAN controller 230. If at least one of the two CAN controllers 228, 230 generates an associated RXD frame, then the CAN controller unit 226 also has access to this at least one generated RXD frame. Therefore, it has been found to be advantageous if the CAN controller unit 226 selects the valid RXD frame.

The CAN controller unit 226 may be configured to select, in a step l), the first RXD frame as a valid RXD frame if the first error is not detected. The generation of the first RXD frame assumes that the first error is not detected. It is also possible that the CAN controller unit 226 is configured to select the first RXD frame as a valid RXD frame in the step l) if the first RXD frame is generated.

In an example, step l) may be independent of a generated second RXD frame and/or independent of a presence/absence of the second error. In this example, the valid RXD frame may (always) be formed by the first RXD frame if the first RXD frame has been generated and/or if the first error is not detected.

In one embodiment, the CAN controller unit 226 may be configured to select the first RXD frame as the valid RXD frame in the step l) if both the first error is not detected and the second error is detected. In this case, only the generated, first RXD frame may constitute the valid frame.

The CAN controller unit 226 may be configured to select, in a step m), either the first RXD frame or the second RXD frame as a valid RXD frame if both the first error and the second error are not detected. Preferably, in step m), the CAN controller unit 226 is configured to select the second RXD frame as a valid RXD frame if both the first error and the second error are not detected. In an example, it is possible for the first CAN controller 228 to generate the first RXD frame and the second CAN controller 230 to generate the second RXD frame. For the two RXD frames to be generated, it is necessary that neither the first error nor the second error be detected. In the example, the CAN controller unit 226 may be configured to select the second RXD frame as the valid RXD frame and discard the first RXD frame in the step m).

The CAN controller unit 226 may be configured to select the second RXD frame as a valid RXD frame in a step n) if both the first error is detected and the second error is not detected. The first error indicates that the first CAN frame cannot be validly generated. The second frame may be generated by the second CAN controller 230 if the second error is not detected. Therefore, in this case, the CAN controller unit 226 may select the second frame as the valid RXD frame.

The CAN controller unit 226 may be configured to execute at least one of steps n), l), and m). In an example, the CAN controller unit 226 may be configured to perform at least one of steps n), l), and m) depending on the associated conditions.

In a further embodiment, the CAN controller unit 226 may be configured to execute step n) and/or step l). The respective step n), l) is actually executed by the CAN controller unit 226 only if the associated condition is met.

In a further embodiment, the CAN controller unit 226 may be configured to execute step n) and/or step m). Again, the respective step n), m) is actually executed by the CAN controller unit 226 only if the associated condition is met.

In a further embodiment, the CAN controller unit 226 may be configured to execute the step n) and/or the step m) and/or the step l). As outlined before, the respective step n), m), l) is actually executed by the CAN controller unit 226 only if the associated condition is met. Furthermore, the CAN controller unit 226 may be configured to execute the step m) alternatively to the step l), or vice versa. Preferably, the CAN controller unit 226 is configured to execute exactly one of the steps n), m), l) for selecting a valid frame.

By performing at least one of steps l), m), and n), it is possible by means of the CAN controller unit 226 to select a valid RXD frame. This valid RXD frame may be used for further processing. In an example, the CAN controller unit 226 may include a further interface 288 to provide and/or transmit the valid RXD frame.

Multiple CAN devices 102, 104, 106 (see FIG. 1) may each be formed by CAN device 202 as previously explained in connection with FIGS. 2-6. The CAN device 202 offers the advantage that a first CAN device 102 can establish error-robust communication to any other CAN device 104, 106, even if one of the other two CAN devices 104 is located at a small distance and the other of the two CAN devices 106 is located at a large distance. Possible reconstruction errors, in particular indicated by the first error and/or second error, can be detected by the first CAN device 102, 202. The possibility of detecting the first and/or second error can ensure that in particular also an RXD frame can be reconstructed from a (second) RXD signal caused by the distant CAN device 106 via a CAN bus signal. Furthermore, there is the possibility of reconstruction of an RXD frame from a (first) RXD signal caused by the nearby CAN device via a CAN bus signal. Therefore, the first CAN device 102 can communicate without error with the closely located CAN device 104 as well as without error with the remotely located CAN device 106.

If a CAN system 100 has several CAN devices 102, 104, 106 (see FIG. 1), where the CAN devices 102, 104, 106 are not arranged very far from each other, the probability that the first and/or second error occurs decreases in principle. However, for the same CAN system 100, the probability may increase the smaller the duration of each bit of a TXD signal 280, 329 is selected or the larger the transmission rate is selected. In an advantageous consideration, the occurrence of the first and or second error may be acceptable if in return a higher transmission rate is achievable by means of the CAN system 100. The first and or second errors are detected by the first CAN controller 228 and the second CAN controller 230, respectively. From the possibility to detect the first and/or second error results the advantage that a predefined duration of each bit of a TXD signal, can be reduced, so that a higher transmission rate is achievable with the CAN devices 202, 102, 104, 106 and/or the CAN system 100. Each bit of a TXD signal 280, 329 may have the duration of a reference time interval. In light of the foregoing discussion, in an example, the reference time interval may be less than 2 µs. In an example, the reference time interval is between 200 ns and 1500 ns. Due to the short duration of the reference time interval or the short duration of each TXD bit, a particularly high transmission rate can be achieved. At the same time, the CAN devices 102, 104, 106 can be arranged up to 80 meters apart, for example.

Previously, it was explained that the first CAN controller 228 is configured to perform steps d) through g). According to step d), a plurality of bit values 262, 264, 265 of the first RXD signal 206 are sampled by the first CAN controller 228. In step f), if the two sampled bit values 262, 264 following a first idle state 216 are detected, the first CAN controller 228 performs a positive detection of the first error if the two bit values 262, 264 each represent a dominant signal level or bit. The detection of the first error may occur temporally immediately after the sampling of the two bit values 262, 264. In one embodiment, the detection of the first error may not occur temporally immediately after the sampling of the two bit values 262, 264. According to Classical CAN, CAN FD and/or CAN XL, each CAN frame comprises several fields. One of the fields is the so-called CRC field. In addition to the first two bit values 262, 264, the first CAN controller 228 may sample another predefined number and/or sequence of bit values of the first RXD signal 206 and calculate a checksum from the sampled bit values. Further, the first CAN controller 228 may compare the calculated checksum to a CRC field and/or its represented value. If the first two bit values 262, 264 following the first idle state 216 each represent a dominant signal level, a reconstruction error is present in the second bit value 264 such that the checksum will differ from the value represented by the CRC field. Against this background, the first error may be caused by the sequence of the two bit values 262, 264 and may be detected by the first CAN controller 228 by means of determining the checksum and matching the checksum with the value represented by the CRC field. Thus, the detection of the first error according to step f) can be detected by the first CAN controller 228 in time immediately after the sampling of the two bit values 262, 264 or later, in particular several bit lengths later. Provided that the two bit values 262, 264 each represent a dominant signal level, the detection of the first error by means of the first CAN controller 228 takes place before the generation of the first RXD frame or before step g). In an example, the first CAN controller 228 may be configured to perform step f) immediately after sampling the CRC field of a CAN frame represented by the first RXD signal 206. The CRC field comprises a plurality of bits.

Previously, it was explained that the second CAN controller 230 is configured to perform steps h) through k). According to step h), a plurality of bit values 270, 272, 273 of the second RXD signal 212 are sampled by the second CAN controller 230. In step j), if the two sampled bit values 270, 272 following a second idle state 217 are detected, the second CAN controller 230 performs a positive detection of the first error if the two bit values 270, 272 each represent a dominant signal level or a dominant bit. The detection of the second error may occur temporally immediately after the sampling of the two bit values 270, 272. In one embodiment, the detection of the second error may not occur temporally immediately after the sampling of the two bit values 270, 272. In addition to the first two bit values 270, 272, the second CAN controller 230 may sample another predefined number and/or sequence of bit values of the second RXD signal 212 and calculate a checksum from the sampled bit values. Furthermore, the second CAN controller 230 may compare the determined checksum with a CRC field represented by the second RXD signal 212 or its value. If the first two bit values 270, 272 following the second idle state 217 each represent a dominant signal level, a reconstruction error is present in the second bit value 272 such that the checksum will differ from the value represented by the CRC field. Against this background, the second error may be caused by the sequence of the two bit values 270, 272 and may be detected by the second CAN controller 230 by means of determining the checksum and matching the checksum with the value represented by the CRC field. Thus, the detection of the second error according to step j) can be detected by the second CAN controller 230 in time immediately after the sampling of the two bit values 270, 272 or later, in particular several bit lengths later. Provided that the two bit values 270, 272 each represent a dominant signal level, the detection of the second error by means of the second CAN controller 230 takes place before the generation of the second RXD frame or before step k). In an example, the second CAN controller 230 may be configured to perform step j) immediately after sampling the CRC field of a CAN frame represented by the second RXD signal. The CRC field comprises a plurality of bits.

The first CAN controller 228 may be configured not to generate an error frame should the first error be detected in step f). Suppressing the generation of the error frame causes the second CAN controller 230 to continue to have the possibility to generate the second RXD frame without errors in step k).

The second CAN controller 230 may be configured not to generate an error frame should the second error be detected in step j). Suppressing the generation of the error frame causes the first CAN controller 228 to continue to have the possibility to generate the first RXD frame without error in step g).

The CAN controller unit 226 may be configured to control the first CAN controller 228 to generate a TXD signal such that the TXD signal represents an error frame if both the first error is detected in step f) and the second error is detected in step j). Sending the error frame in this case is not detrimental, since neither of the RXD frames (first RXD frame and second RXD frame) can be reconstructed without error.

In the following, the signal characteristics shown in FIG. 6 will be discussed again. If two CAN devices 102, 106, which are arranged very far away from each other, are coupled to each other via a CAN bus 108, the third delay time Z3 may cause the situation that both the first CAN device 102 and the third CAN device 106 start sending a TXD signal 280, 329, so that in an example a first RXD signal 206 is generated by the first CAN device 102, where the first RXD signal 206 has a first error. This first error is caused by an extended duration of a dominant signal level 222 immediately following the first signal change 218. The extended duration of the dominant signal level 222 results in a sampling of two bit values 262, 264, each representing a dominant signal level 222. This contradicts the expectation according to the definition introduced earlier, which requires that each frame begin with a sequence of a dominant bit and a recessive bit. The dominant bit would have to be represented by a dominant signal level and the recessive bit would have to be represented by a recessive signal level.

Detection of a first error by means of the first CAN controller 228 may have a positive effect on the overall transmission rate of the CAN system 100, such as shown in FIG. 1, because detection of the first error may allow the first CAN controller 228 of the first CAN device 102 to cancel transmission of the first TXD signal 280. By canceling transmission of the first TXD signal 280, a first CAN controller of the third CAN device 106 may continue transmission of the third TXD signal 329. The continued transmission of the third TXD signal 329 assigns some preference to the remotely located CAN device 106 while allowing very remotely located CAN devices 102, 106 to communicate with each other via a CAN bus 108. Once transmission of a CAN frame represented by the third TXD signal 329 is complete, an idle state again follows. After the idle state, the first CAN device 102 may again attempt to transmit a CAN frame via the first TXD signal 280.

The sampled two bit values 262, 264 of the first RXD signal 206 following the first idle state 216, and in particular the first signal change 218, are also referred to as the next two bit values 262, 264 of the first RXD signal 206 and/or the first bit value 262 of the first RXD signal 206 and the subsequent second bit value 264 of the first RXD signal 206.

The first CAN controller 228 may be configured to implement a definition that each CAN frame begins with a sequence of a dominant bit and a subsequent recessive bit. The first CAN controller 228 may be configured to perform a first check to determine whether the first bit value 262 of the first RXD signal 206 represents a dominant signal level and whether the second bit value 264 of the first RXD signal 206 represents a recessive signal level. With the first check, the first CAN controller 228 can check, based on the aforementioned definition, whether a new CAN frame represented by the first RXD signal 206 begins with a sequence of a dominant bit and a subsequent recessive bit. Previously, it was explained that the first CAN controller 228 may detect a first error if the first bit value 262 and the second bit value 264 each represent a dominant signal level. The first CAN controller 228 may further be configured to prevent (positive) detection of the first error if a result of the first check indicates that the first bit value 262 of the first RXD signal 206 represents a dominant signal level and the second bit value 264 of the first RXD signal 206 represents a recessive signal level. If the first error is not detected by the first CAN controller 228, the first CAN controller 238 may continue to sample the first RXD signal 206 and generate a first CAN frame based on the sampled bit value 262, 264, 265. Detection of the first error may be prevented, for example, if the previously explained situation does not occur or if the remotely located third CAN device 106 does not attempt to communicate in parallel with the first CAN device 106 via the CAN bus 108. Each CAN device 102, 104, 106 may be configured according to CAN device 202 as schematically shown in an example in FIG. 2. The CAN device 202, 102 provides the advantage and capability of enabling communication to a distantly located further CAN device 202, 106 and/or communication to a closely located further CAN device 202, 104, while allowing a high transmission rate over the CAN bus 108.

The first CAN controller 228 and the second CAN controller 230 may be configured likewise or even identically. The same configuration for both CAN controllers 228, 230 allows for efficient fabrication of the CAN controller unit 226.

As for the first CAN controller 228, the second CAN controller 230 may also implement the definition that each CAN frame begins with a sequence of a dominant bit followed by a recessive bit. The sampled two bit values 270, 272 of the second RXD signal 212 following the second idle state 217, and in particular the second signal change 224, are also referred to as the next two bit values 270, 272 of the second RXD signal 212 and/or the first bit value 270 of the second RXD signal 212 and the subsequent second bit value 272 of the second RXD signal 212. The second CAN controller 230 may be configured to perform a second check to determine whether the first bit value 270 of the second RXD signal 212 represents a dominant signal level and whether the second bit value 272 of the second RXD signal 212 represents a recessive signal level. With the second check, the second CAN controller 230 can check, based on the previously mentioned definition, whether a new CAN frame represented by the second RXD signal 212 starts with a sequence of a dominant bit and a subsequent recessive bit. Previously, it was explained that the second CAN controller 230 may detect a second error if the first bit value 270 and the second bit value 272 each represent a dominant signal level. The second CAN controller 230 may further be configured to prevent (positive) detection of the second error if a result of the second test indicates that the first bit value 270 of the second RXD signal 212 represents a dominant signal level and the second bit value 272 of the second RXD signal 212 represents a recessive signal level. If the second error is not detected by the second CAN controller 230, the second CAN controller 230 may continue to sample the second RXD signal 212 and generate a second CAN frame based on the sampled bit value 270, 272, 273. The CAN device 202, 102 with the second CAN controller 230 provides the advantage and capability of enabling communication to a distantly located further CAN device 202, 106 and/or communication to a closely located further CAN device 202, 104, while allowing a high transmission rate.

Figure 7:
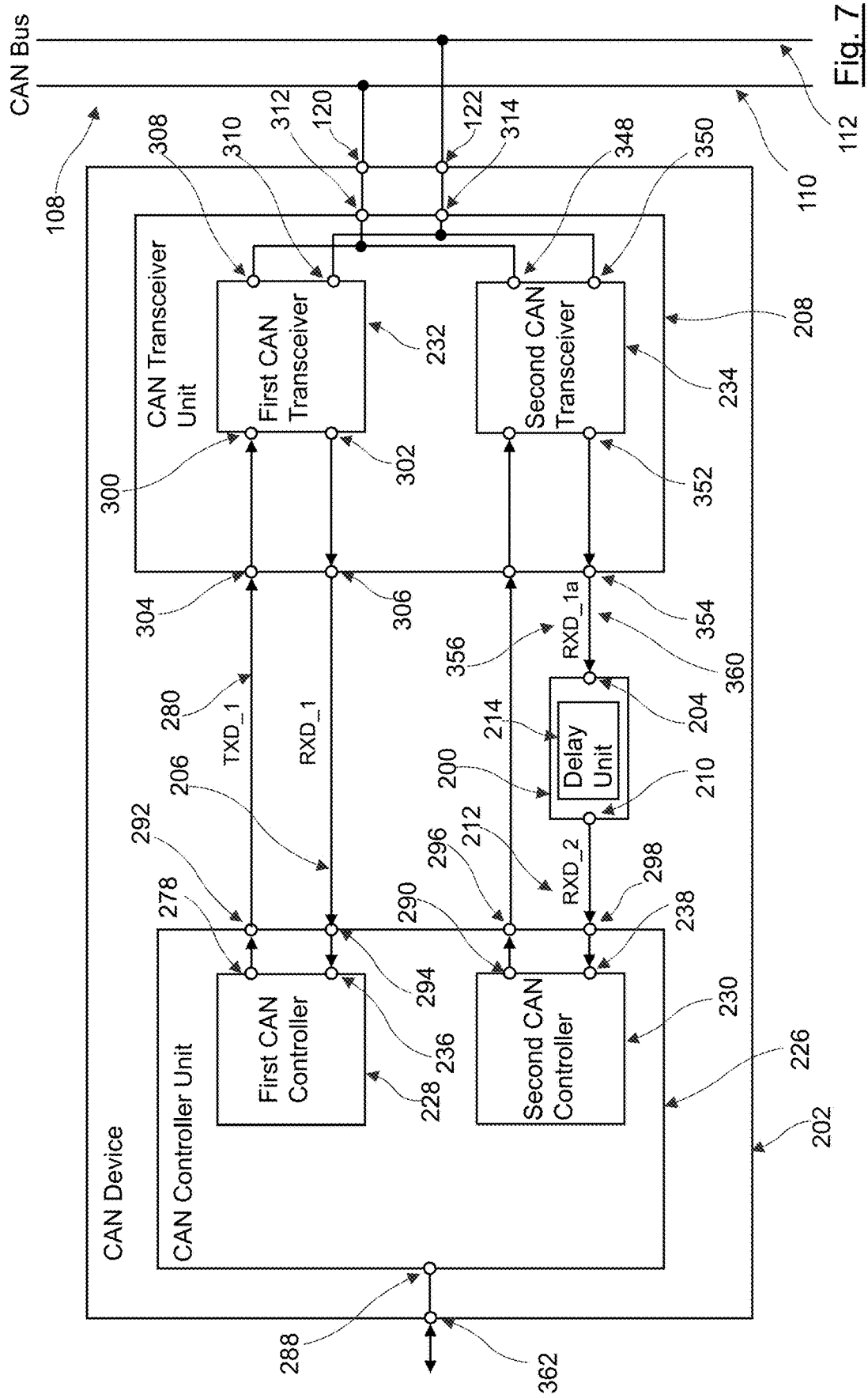

FIG. 7 schematically shows an example of a further embodiment of the CAN device 202. The design of the CAN device 202 in FIG. 7 differs from the design of the CAN device 202 in FIG. 2 in particular by the CAN transceiver unit 208. In the following, the design of the CAN device 202 in FIG. 7 will be discussed.

The CAN device 202 may include the CAN transceiver unit 208, which in an example includes the first CAN transceiver 232 and a second CAN transceiver 234. The two CAN transceivers 232, 234 may be configured likewise or even identically. For the second CAN transceiver 234, reference is made to the advantageous explanations, preferred features, technical effects and advantages in an analogous manner as already explained for the first CAN transceiver 232.

The second CAN transceiver 234 has a third CAN BUS interface 348 and a fourth CAN BUS interface 350. The third CAN BUS interface 348 of the second CAN transceiver 234 may be connected to the first CAN bus line 110 of the CAN bus 108. The connection between the third CAN BUS interface 348 and the first CAN bus line 110 may be established via at least one additional interface 312, 120. In an example, the third CAN BUS interface 348 of the second CAN transceiver 234 may be connected to the interface 312, which may be connected to the first device interface 120 of the CAN device 202. The first device interface 120 may be connected to the first CAN bus line 110.

The fourth CAN BUS interface 350 of the second CAN transceiver 234 may be connected to the second CAN bus line 112 of the CAN bus 108. The connection between the fourth CAN BUS interface 350 and the second CAN bus line 112 may be established via at least one further interface 314, 122. In an example, the fourth CAN BUS interface 350 of the second CAN transceiver 234 may be connected to the interface 314, which may be connected to the second device interface 122 of the CAN device 202. The second device interface 122 may be connected to the second CAN bus line 112.

The second CAN transceiver 234 is configured to detect the CAN bus signal of the CAN bus 108 via the third and fourth CAN BUS interfaces 348, 350. The first CAN transceiver unit 232 and the second CAN transceiver unit 234 may detect the same CAN bus signal of the CAN bus 108, in particular in parallel in time. The second CAN transceiver 234 may be configured to generate an RXD signal 356 ("RXD_1a") based on the detected CAN bus signal. In an example, the RXD signal 356 and the first RXD signal 206 generated by the first CAN transceiver 232 are identical. In particular, the identity of the two RXD signals 356, 206 ("RXD_1a", "RXD_1") is present if the first CAN transceiver 232 and the second CAN transceiver 234 are configured at least substantially the same. For the RXD signal 356, reference is therefore made to the preceding explanations, preferred features, technical effects and advantages in an analogous manner as already explained for the first RXD signal 206. Furthermore, the RXD signal 356 may also be referred to and/or understood as the first RXD signal 356 due to its identity to the first RXD signal 206. The RXD signal 356 may be a duplicate of the first RXD signal 206. As a result, both CAN transceivers 232, 234 may generate identical, first RXD signal 206, 356.

The second CAN transceiver 234 also includes an RXD interface 352, referred to as the fourth RXD interface 352. The second CAN transceiver 234 may be configured to send the first RXD signal 356 over the fourth RXD interface 352.

The CAN transceiver unit 208 may include another RXD interface 354 connected to the fourth RXD interface 352 of the second CAN transceiver 234. In an example, the RXD interface 354 may be formed by the fourth RXD interface 352 of the second CAN transceiver 234 (not shown). If referring hereinafter to the fourth RXD interface 352 of the second CAN transceiver 234, such reference may refer either to the fourth RXD interface 352 of the second CAN transceiver 234 and/or to the RXD interface 354 of the CAN transceiver unit 208. Preferably, the fourth RXD interface 352 of the second CAN transceiver 234 is connected to the first module interface 204 of the delay module 200 via a signal connection 360. In an example, the signal connection 360 may extend from the fourth RXD interface 352 through the interface 354 to the first module interface 204. The signal connection 360 may allow the second CAN transceiver 234 to transmit the first RXD signal 356 from the fourth RXD interface 352 to the first module interface 204 of the delay module 200. Equally to the first RXD signal 206 of the first CAN transceiver 232, the delay module 200 receives the first RXD signal 356 of the second CAN transceiver 234. Since the two first RXD signals 206, 356 are preferably the same, the first RXD signal 356 is used by the delay module 200, and in particular by the associated delay unit 214 in the same manner as has already been explained for the use of the first RXD signal 206. Therefore, the delay unit 214 of the delay module 200 generates the second RXD signal 212 based on the first RXD signal 356 as previously described for the first RXD signal 206.

In both the embodiment of the CAN device 202 of FIG. 2 and the embodiment of the CAN device 202 of FIG. 7, the delay module 200 is coupled between the CAN transceiver unit 208 and the CAN controller unit 226. In both embodiments, the first RXD signal 206, 356 is directed to the first module interface 204 of the delay module 200. In both embodiments, the second RXD signal 212 is transmitted to the second CAN controller 230.

In an example not shown, it is possible for the delay module 200 to form part of the CAN transceiver unit 208. With reference to the embodiment of the CAN device 200 of FIG. 7, the delay module 200 may be coupled between the fourth RXD interface 352 of the second CAN transceiver 234 and the RXD interface 354. In this example, the RXD interface 354 may be coupled to the second RXD interface of the second CAN controller 230 via the signal connection 360, preferably via the further RXD interface 298. In this case, the first RXD signal 356 travels from the fourth RXD interface 352 to the first module interface 204, and the second RXD signal 212 is transmitted from the delay module 200 to the second RXD interface 238 of the second CAN controller 230 via the associated, second module interface 210. Therefore, the operation of the CAN device 202 according to the two previously explained examples corresponds to the operation of the embodiment of the CAN device 202 of FIG. 7. As a result, even though the delay module 200 may form part of the CAN transceiver unit 208, the second RXD interface 238 of the second CAN controller 230 is coupled to the CAN transceiver unit 208 via the delay module 200 to receive the second RXD signal 212.

In another example not shown, it is possible for the delay module 200 to form part of the CAN controller unit 226. With reference to the embodiment of the CAN device 202 of FIG. 7, the delay module 200 may be coupled between the RXD interface 298 and the second RXD interface 238 of the second CAN controller 230. In this example, the fourth RXD interface 352 may be coupled to the RXD interface 298 via the signal connection 360, preferably via the RXD interface 354. In this case, the first RXD signal 356 travels from the fourth RXD interface 352 to the first module interface 204 via the signal connection 360. The second RXD signal 212 is transmitted from the delay module 200 to the second RXD interface 238 of the second CAN controller 230 via the associated, second module interface 210. Therefore, the operation of the CAN device 202 according to the two previously explained examples corresponds to the operation of the embodiment of the CAN device 202 of FIG. 7. As a result, even though the delay module may form a part of the CAN controller unit 226, the second RXD interface 238 of the second CAN controller 230 is coupled to the CAN transceiver unit 208 via the delay module 200 to receive the second RXD signal 212.

The further explanations may refer to any embodiment of the CAN device 202, in particular the CAN device 202 of FIG. 2 or the CAN device 202 of FIG. 7.

The first CAN controller 228 is configured such that the first CAN controller 228 change between a transmit mode and a receive mode. Therefore, the first CAN controller 228 may be in either the transmit mode or the receive mode. Further, if the first CAN controller 228 is in the transmit mode, the first CAN controller 228 is configured to perform as step o): Transmitting the first TXD signal 280 representing a TXD frame via the first TXD interface 278. Preferably, the first CAN controller 228 starts transmitting the TXD signal 280 immediately with the third signal change 332 (see FIG. 6). The TXD signal 280 is transmitted to the CAN transceiver unit 208, and preferably to the third TXD interface 300 of the first CAN transceiver 232. The first CAN transceiver 232 is preferably configured to generate a corresponding CAN bus signal based on the TXD signal 280 and to transmit the CAN bus signal via the CAN bus 108 using the first and second CAN BUS interfaces 308, 310.

The first CAN controller 228 may be configured such that the first CAN controller 228 changes from transmit mode to receive mode after the first CAN controller 228 transmits a TXD signal 280 representing a TXD frame. Further, the first CAN controller 228 may be configured to change to the receive mode if the first CAN controller 228 stops transmitting the TXD signal 280.

The first CAN controller 228 may be configured such that the first CAN controller 228 changes from the receive mode to the transmit mode if the first CAN controller detects a first idle state 216 using the first RXD signal 206. Upon detecting the first idle state 216 and then changing to the transmit mode, the first CAN controller 228 may begin transmitting the TXD signal 280.

The first CAN controller 228 may be configured such that the TXD signal 280 represents the TXD frame, wherein a first bit of the TXD frame, also referred to as the start-of-frame bit or SOF bit, is a dominant bit, and wherein the next bit of the TXD frame following the first bit of the TXD frame is a recessive bit. As a result, the first two bits of the TXD frame are predefined by a sequence of a dominant bit and a recessive bit. This definition has been explained before. The advantages resulting from the definition have also been explained. Reference is made here to the corresponding explanations. In particular, the definition allows efficient communication to be enabled both between CAN devices 102, 104 arranged close to each other and between CAN devices 102, 106 arranged far away from each other. In particular, the definition also allows detection of the first and/or second error.

In another example, if the first CAN controller 228 is in transmit mode, the first CAN controller 228 is configured to cancel step o) if the first CAN controller 228 detects the first error. The first CAN controller 228 detects the first error if each of the two sampled bit values 262, 264 of the first RXD signal 206 represents a dominant signal level 222. This sequence of two bit values, each representing a dominant bit, is contrary to the definition previously explained. Therefore, the first CAN controller 228 will detect the first error based on the detection of the two bit values 262, 264 if they each have a dominant signal level 222. Further transmission of the first TXD signal 280 representing the first RXD frame is not useful. Rather, with the detection of the first error, it is useful to stop sending the TXD signal 280 so that the remote CAN device 106 can continue transmitting another TXD frame that is also represented by the second RXD signal 212. As a result, the far-away CAN device 106 is given priority. This precedence also gives a far-away CAN device 106 a chance to establish communication over a much-used CAN bus 108.

It was previously mentioned that the first CAN controller 238 may have implemented the Classical CAN protocol, the CAN FD protocol, and/or the CAN XL protocol. The first CAN controller 228 may be configured to perform arbitration defined according to one of the previously mentioned protocols. In an example, the first CAN controller 228 may be configured, if the first CAN controller is in the transmit mode, to perform bitwise arbitration based on the bits of the TXD frame and the sampled bit values 262-265 of the first RXD signal 206, and to cancel step o) if the arbitration indicates that at least one bit of the TXD frame is different from a corresponding sampled bit value of the first RXD signal 206.

The first CAN controller 228 is configured to sample a plurality of bit values 262, 264, 265 of the first RXD signal 206 in step d). The sampling of the bit values 262, 264, 265 may be synchronized with the third signal change 332 if the first CAN controller 228 is in transmit mode. In an example, if the first CAN controller 228 is in transmit mode, the first CAN controller 228 is configured to sample the first bit value 262 of the first RXD signal 206 such that a first time interval exists and/or is provided between a start time of step o) (the sending of the TXD signal) and a first sampling time of the first bit value 262 of the first RXD signal 206. The first time interval is between 30% and 90% of a predefined reference time interval. Preferably, the reference time interval corresponds to the duration of a single bit of the first TXD signal 280. In an example, the reference time interval is less than 2 µs. The first CAN controller 228 is configured, if the first CAN controller 228 is in transmit mode, such that the first CAN controller 228 samples the second bit value 264 of the first RXD signal 206 such that the reference time interval is between the first sampling time (of the first bit value 262) and a sampling time of the second bit value 264 of the first RXD signal 206. The preferred determination of the sampling times for the first and second bit values 262, 264 during the transmit mode provides the advantage that if this first error occurs during the transmit mode, it can be reliably detected by the first CAN controller 228.

If the first CAN controller 228 is not in transmit mode, no TXD signal 280 that could represent a TXD frame is transmitted by the first CAN controller 228. Therefore, a synchronization of the sampling of the bit values 262, 264, 265 of the first RXD signal 206 in step d) cannot be synchronized to the signal change 332. The sampling of the bit values 262, 264, 265 of the first RXD signal 206 may be synchronized to the first signal change 218 if the first CAN controller 228 is in receive mode. Therefore, if the first CAN controller 228 is in receive mode, the first CAN controller 228 is configured to sample the first bit value 262 of the first RXD signal 206 such that a second time interval exists and/or is provided between the end of the first idle state 216 (or the first signal change 218) and the third sampling time of the first bit value 262 of the first RXD signal 206. The second time interval is between 30% and 90% of the predefined reference time interval. As previously mentioned, the reference time interval may be less than 2 µs. The first CAN controller 228 may be configured, if the first CAN controller 228 is in receive mode, to sample the second bit value 264 of the first RXD signal 206 such that the reference time interval is between the third sampling time (of the first bit value 262) and the sampling time of the second bit value 264 of the first RXD signal 206. The preferred determination of the sampling time for the first and second bit values 262, 264 during the receive mode provides the advantage that if the first error occurs during the receive mode, the first error can be reliably detected by the first CAN controller 228.

The second CAN controller 230 is configured to sample a plurality of bit values 270, 272, 273 of the second RXD signal 212 in step h). The sampling of the bit values 270, 272, 273 of the second RXD signal 212 may be synchronized with the second signal change 224. In an example, the second CAN controller 230 is configured such that the second CAN controller 230 samples the first bit value 270 of the second RXD signal 212 such that a third time interval exists and/or is provided between the end of the second idle state 217 (or the second signal change 224) and a fifth sampling time of the first bit value 270 of the second RXD signal 212. The third time interval is between 30% and 90% of the predefined reference time interval. As previously mentioned, the reference time interval may be less than 2 µs. The second CAN controller 230 may be configured such that the second CAN controller samples the second bit value 272 of the second RXD signal 212, such that the reference time interval is between the fifth sampling time (of the first bit value 270) and a sampling time of the second bit value 272 of the second RXD signal 212.

In connection with the explanation of the operation of the delay module 200, it has already been pointed out that the delay unit 214 of the delay module 200 may be configured to generate the second RXD signal 212 based on the first RXD signal 206 such that the first signal change 218 is delayed by the predetermined, first delay time Z1 with the result that the second RXD signal 212 has the second signal change 224 instead of the first signal change 218. The second signal change 224 is delayed in time by the first delay time Z1 with respect to the first signal change 218. Apart from the two signal changes 218, 224, the second RXD signal 212 corresponds to the first RXD signal 206. In an example, the first delay time Z1 is between 30% and 190% of the predefined reference time interval. It has been found advantageous if the first delay time Z1 is between 30% and 90% of the reference time interval, or between 60% or 90% of the reference time interval. In an example, the first delay time Z1 may be selected and/or predefined depending on the largest distance between two CAN devices 102, 106 of a CAN system 100. The selection of the first delay time Z1 may be within the previously mentioned limits. An appropriate choice of the first delay time Z1 improves the probability that the second CAN controller 230 detects the second frame reliably.

The CAN controller unit 226 may be configured to select the valid RXD frame by performing any of steps n), m), l). The valid RXD frame may be for further use in the CAN controller unit 226 and/or the CAN device 202. In an example, the CAN controller unit 226 may be configured to extract payload data of the valid TXD frame. The CAN controller unit 226 may store the payload data. The CAN controller unit 226 may be configured to provide and/or send the payload data via the further interface 288. The CAN device 202 may include a further interface 362. The CAN device 202 may be configured to send the payload data via the interface 362. In this way, the payload data may be made available to other devices.

Figure 8:
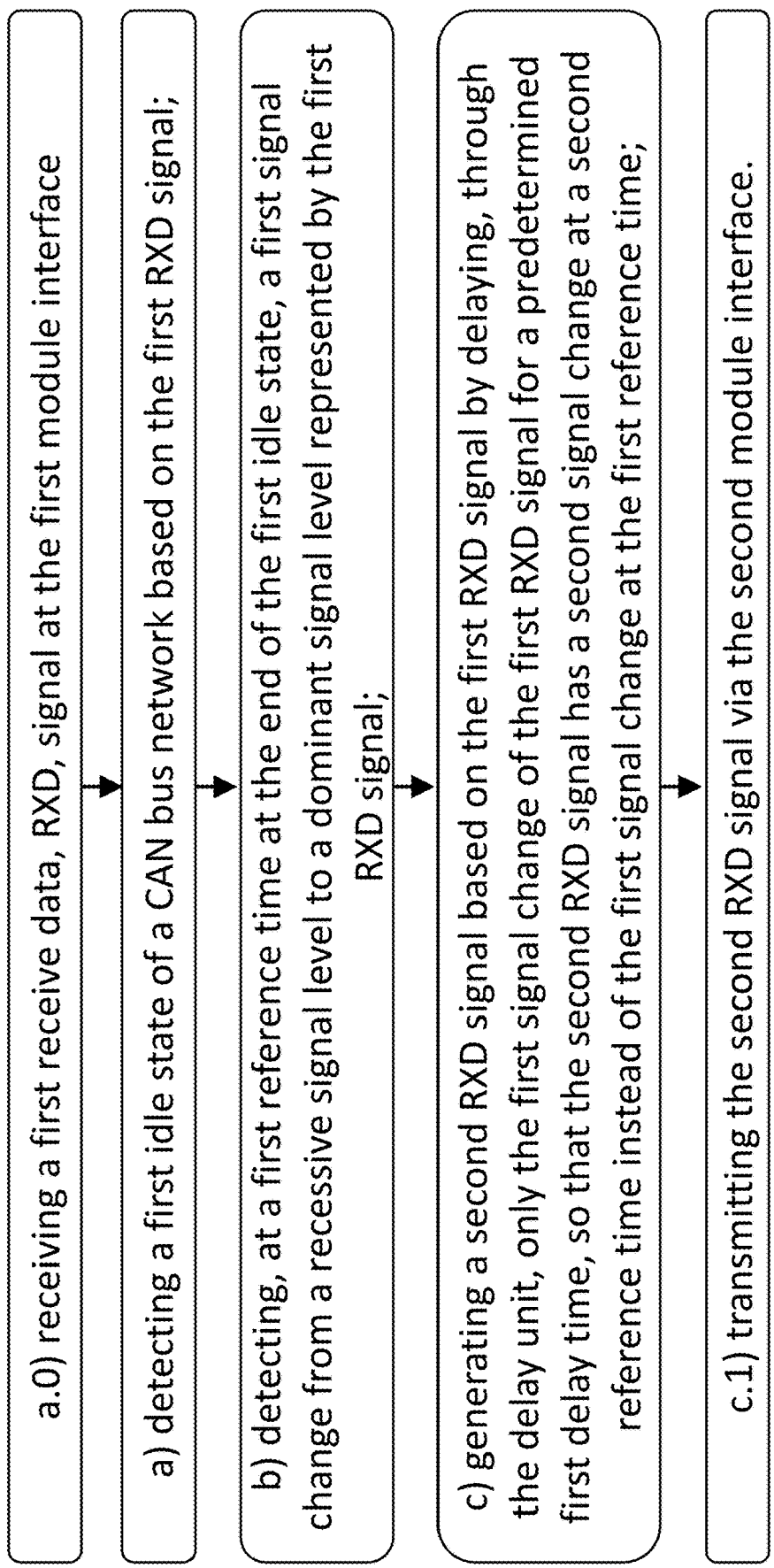
FIG. 8 shows a simplified flow chart of an embodiment of the method.

FIG. 8 schematically illustrates an example of a flowchart of an embodiment of a method for the delay module 200. The delay module 200 may be used in a CAN device 202. The delay module 200 includes the first module interface 204, the second module interface 210, and the delay unit 214 coupled between the first module interface 204 and the second module interface 210. The method for the delay module 200 may include the steps of:

a.0) receiving a first receive data, RXD, signal 206 at the first module interface 204;

a) detecting a first idle state 216 of a CAN bus network 108 based on the first RXD signal 206;

b) detecting, at a first reference time R1 at the end of the first idle state 216, a first signal change 218 from a recessive signal level 220 to a dominant signal level 222 represented by the first RXD signal 206;

c) generating a second RXD signal 212 based on the first RXD signal 206 by delaying, through the delay unit 214, only the first signal change 218 of the first RXD signal 206 for a predetermined first delay time, so that the second RXD signal 212 has a second signal change 224 at a second reference time R1 instead of the first signal change 218 at the first reference time R1; and c.1) transmitting the second RXD signal 212 via the second module interface 210.

For the method, reference is made to the preceding explanations, preferred features, technical effects and advantages in an analogous manner as previously explained in connection with the delay module 200 and/or the CAN device 202.

Although the described exemplary embodiments disclosed herein focus on devices, systems, and methods for using same, the present disclosure is not necessarily limited to the example embodiments illustrate herein.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first", "second", etc. are used to arbitrarily distinguish between the elements such terms describe. Thus, these terms are not necessarily intended to indicate temporal or other prioritization of such elements.

The invention claimed is:

1. A delay module for a Controller Area Network (CAN) device, comprising:
   a first module interface for receiving a first receive data (RXD) signal from a CAN Transceiver unit, which is configured to be connected to a CAN bus network,
   a second module interface for transmitting a second RXD signal, and
   a delay unit coupled between the first module interface and the second module interface, wherein the delay unit is configured to perform the following steps:
   detect a first idle state of the CAN bus network based on the first RXD signal;
   detect, at a first reference time at the end of the first idle state, a first signal change from a recessive signal level of the first RXD signal to a dominant signal level of the first RXD signal; and
   generate the second RXD signal based on the first RXD signal by delaying, through the delay unit, only the first signal change of the first RXD signal for a predetermined first delay time, so that the second RXD signal has a second signal change at a second reference time instead of the first signal change at the first reference time.

2. A CAN Device comprising:
a delay module according to claim 1, a CAN controller unit, and a CAN transceiver unit;
the CAN controller unit comprising a first CAN controller and a second CAN controller;
wherein the CAN transceiver unit comprises at least one CAN transceiver;
wherein a first RXD interface of the first CAN controller is coupled to the CAN transceiver unit for receiving the first RXD signal at the first CAN controller;
wherein a second RXD interface of the second CAN controller is coupled via the Delay module to the CAN transceiver unit for receiving the second RXD signal at the second CAN controller;
wherein the first CAN controller is configured to perform the following steps:
  sample a plurality of bit values of the first RXD signal;
  detect the first idle state of the CAN bus network based on the sampled bit values of the first RXD signal;
  detect a first error, if each of the next two bit values of the first RXD signal following the first idle state represents a dominant signal level; and
  generate a first RXD frame based on the bit values of the first RXD signal following the first idle state, if the first error is not detected;
wherein the second CAN controller is configured to perform the following steps:
  sample a plurality of bit values of the second RXD signal;
  detect a second idle state of the CAN bus network based on the sampled bit values of the second RXD signal;
  detect a second error, if each of the next two bit values of the second RXD signal following the second idle state represents a dominant signal level; and
  generate a second RXD frame based on the bit values of the second RXD signal following the second idle state, if the second error is not detected; and
wherein the CAN controller unit is configured to perform at least one of the following steps:
  select the first RXD frame as a valid RXD frame, if the first error is not detected;
  select the second RXD frame as a valid RXD frame, if both the first and second error are not detected; or
  select the second RXD frame as the valid RXD frame, if both the first error is detected and the second error is not detected.

3. The CAN Device according to claim 2, wherein the next two bit values of the first RXD signal following the first idle state are referred to as the first bit value of the first RXD signal and the subsequent second bit value of the first RXD signal, wherein the first CAN controller is configured to perform a first check whether the first bit value of the first RXD signal represents a dominant signal level and whether the second bit value of the first RXD signal represents a recessive signal level, and wherein the first CAN controller is configured to prevent the detection of the first error, if a result of the first check indicates that the first bit value of the first RXD signal represents a dominant signal level and that the second bit value of the first RXD signal represents a recessive signal level.

4. The CAN device according to claim 3, wherein the next two bit values of the second RXD signal following the second idle state are referred to as the first bit value of the second RXD signal and the subsequent second bit value of the second RXD signal;
wherein the second CAN controller is configured to perform a second check whether the first bit value of the second RXD signal represents a dominant signal level and whether the second bit value of the second RXD signal represents a recessive signal level, and
wherein the second CAN controller is configured to prevent the detection of the second error, if a result of the second check indicates that the first bit value of the second RXD signal represents a dominant signal level and that the second bit value of the second RXD signal represents a recessive signal level.

5. The CAN device according to claim 4, wherein a first transmit data (TXD) interface of the first CAN controller is coupled to the CAN transceiver unit;
wherein the first CAN controller is configured to change between a send mode and a receive mode, and
wherein the first CAN controller, if in the send mode, is further configured to transmit a TXD signal representing a TXD frame via the first TXD interface to the CAN transceiver unit.

6. The CAN device according claim 5, wherein a start of frame (SOF) bit of the TXD frame is a dominant bit and the next bit of the TXD frame following the SOF bit is a recessive bit.

7. The CAN device according to claim 6, wherein the first CAN controller, if in the send mode, is configured to cancel transmission of the TXD signal, if the first error is detected.

8. The CAN device according to claim 6, wherein the first CAN controller, if in the send mode, is configured to perform bitwise arbitration based on the bits of the TXD frame and the sampled bit values of the first RXD signal, in particular for the first RXD frame, and to cancel transmission of the TXD signal, if the arbitration indicates that at least one bit of the TXD frame differs from a corresponding sampled bit value of the first RXD signal, in particular for the first RXD frame.

9. The CAN device according to claim 6, wherein the first CAN controller, if in the send mode, is configured to sample the first bit value of the first RXD signal, such that a first time interval is provided between a start time of transmission of the TXD signal and a first sampling time of the first bit value of the first RXD signal, wherein the first time interval is between 30% and 90% of a predefined reference time interval; and wherein the first CAN controller, if in the send mode, is configured to sample the second bit value of the first RXD signal, such that the reference time interval is provided between the first sampling time and a sampling time of the second bit value of the first RXD signal.

10. The CAN device according to claim 9, wherein the first CAN controller, if in the receive mode, is configured to sample the first bit value of the first RXD signal, such that a second time interval is provided between an end of the first idle state and a third sampling time of the first bit value of the first RXD signal, wherein the second time interval is between 30% and 90% of a predefined reference time interval; and wherein the first CAN controller, if in the receive mode, is configured to sample the second bit value of the first RXD signal, such that the reference time interval is provided between the third sampling time and the sampling time of the second bit value of the first RXD signal.

11. The CAN device according to claim 10, wherein the second CAN controller is configured to sample the first bit value of the second RXD signal, such that a third time interval is provided between an end of the second idle state and a fifth sampling time of the first bit value of the second RXD signal, wherein the third time interval is between 30% and 90% of a predefined reference time interval; and wherein the second CAN controller is configured to sample the second bit value of the second RXD signal, such that the reference time interval is provided between the fifth sampling time and a sampling time of the second bit value of the second RXD signal.

12. The CAN device according to claim 9, wherein the reference time interval is less than two microseconds, preferably between 200 nanoseconds and 1500 nanoseconds.

13. The CAN device according to claim 12, wherein the first delay time is between 30% and 190% of the reference time interval, preferably between 60% and 90% of the reference time interval.

14. The CAN device according to claim 2, wherein the CAN controller unit is configured to extract a payload of the valid RXD frame, and wherein the controller unit is configured to store the payload and/or to transmit the payload via a further interface of the controller unit.

15. A method for a delay module for a Controller Area Network (CAN) device, wherein the delay module comprises a first module interface, a second module interface, and a delay unit coupled between the first module interface and the second module interface, and wherein the method comprises the following steps:
  receiving a first receive data (RXD) signal at the first module interface;
  detecting a first idle state of a CAN bus network based on the first RXD signal;
  detecting, at a first reference time at the end of the first idle state, a first signal change from a recessive signal level to a dominant signal level represented by the first RXD signal;
  generating a second RXD signal based on the first RXD signal by delaying, through the delay unit, only the first signal change of the first RXD signal for a predetermined first delay time, so that the second RXD signal has a second signal change at a second reference time instead of the first signal change at the first reference time; and
  transmitting the second RXD signal via the second module interface.

16. A method for a Controller Area Network, (CAN) device, wherein the CAN device comprises a CAN controller unit and a CAN transceiver unit, wherein the delay module comprises a first module interface, a second module interface, and a delay unit coupled between the first module interface and the second module interface, wherein the CAN controller unit comprises a first CAN controller and a second CAN controller, wherein the CAN transceiver unit comprises at least one CAN transceiver; wherein a first RXD interface of the first CAN controller is coupled to the CAN transceiver unit for receiving the first RXD signal at the first CAN controller; wherein a second RXD interface of the second CAN controller is coupled via the Delay module to the CAN transceiver unit for receiving the second RXD signal at the second CAN controller; and wherein the method comprises the following steps:
  receiving a first, RXD signal at the first module interface;
  detecting a first idle state of a CAN bus network based on the first RXD signal;
  detecting, at a first reference time at the end of the first idle state, a first signal change from a recessive signal level to a dominant signal level represented by the first RXD signal;
  generating a second RXD signal based on the first RXD signal by delaying, through the delay unit, only the first signal change of the first RXD signal for a predetermined first delay time, so that the second RXD signal has a second signal change at a second reference time instead of the first signal change at the first reference time; and
  transmitting the second RXD signal via the second module interface;
  wherein the method further comprises the following steps performed by the first CAN controller:
  sampling a plurality of bit values of the first RXD signal;
  detecting the first idle state of the CAN bus network based on the sampled bit values of the first RXD signal;
  detecting a first error, if each of the next two bit values of the first RXD signal following the first idle state represents a dominant signal level; and
  generating a first RXD frame based on the bit values of the first RXD signal following the first idle state, if the first error is not detected;
  wherein the method further comprises the following steps performed by the second CAN controller:
  sampling a plurality of bit values of the second RXD signal;
  detecting a second idle state of the CAN bus network based on the sampled bit values of the second RXD signal;
  detecting a second error, if each of the next two bit values of the second RXD signal following the second idle state represents a dominant signal level; and
  generating a second RXD frame based on the bit values of the second RXD signal following the second idle state, if the second error is not detected; and
  wherein the method further comprises at least one of the following steps performed by the CAN controller unit:
  selecting the first RXD frame as a valid RXD frame, if the first error is not detected;
  selecting the second RXD frame as a valid RXD frame, if both the first and second error are not detected; and
  selecting the second RXD frame as the valid RXD frame, if both the first error is detected and the second error is not detected.

17. The method of claim 16, wherein the next two bit values of the first RXD signal following the first idle state are referred to as the first bit value of the first RXD signal and the subsequent second bit value of the first RXD signal; and wherein the method further comprises the following steps:
  performing, by the first CAN controller, a first check whether the first bit value of the first RXD signal represents a dominant signal level and whether the second bit value of the first RXD signal represents a recessive signal level; and
  preventing, by the first CAN controller, the detection of the first error, if a result of the first check indicates that the first bit value of the first RXD signal represents a dominant signal level and that the second bit value of the first RXD signal represents a recessive signal level.

18. The method of claim 17, wherein the next two bit values of the second RXD signal following the second idle state are referred to as the first bit value of the second RXD signal and the subsequent second bit value of the second RXD signal; and wherein the method further comprises the following steps:
  performing, by the second CAN controller, a second check whether the first bit value of the second RXD signal represents a dominant signal level and whether the second bit value of the second RXD signal represents a recessive signal level; and
  preventing, by the second CAN controller, the detection of the second error, if a result of the second check indicates that the first bit value of the second RXD signal represents a dominant signal level and that the second bit value of the second RXD signal represents a recessive signal level.

19. The method of claim 18, wherein a first transmit data (TXD) interface of the first CAN controller is coupled to the CAN transceiver unit;
   wherein the first CAN controller is configured to change between a send mode and a receive mode, and
   wherein the method further comprises transmitting, by the first CAN controller, if in the send mode, a TXD signal representing a TXD frame via the first TXD interface to the CAN transceiver unit.

20. The method of claim 19, wherein a start of frame (SOF) bit of the TXD frame is a dominant bit and the next bit of the TXD frame following the SOF bit is a recessive bit.

* * * * *